United States Patent
Zhu et al.

(10) Patent No.: US 12,542,966 B2
(45) Date of Patent: Feb. 3, 2026

(54) SHOOTING METHOD AND ELECTRONIC DEVICE FOR SAVING AN IMAGE FRAME FROM A VIDEO

(71) Applicant: Honor Device Co., Ltd., Shenzhen (CN)

(72) Inventors: Shiyu Zhu, Shenzhen (CN); Zhen Dong, Shenzhen (CN); Weilong Hou, Shenzhen (CN); Yuanchao Du, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 225 days.

(21) Appl. No.: 18/255,995

(22) PCT Filed: Dec. 20, 2022

(86) PCT No.: PCT/CN2022/140204
§ 371 (c)(1),
(2) Date: Jun. 5, 2023

(87) PCT Pub. No.: WO2023/160170
PCT Pub. Date: Aug. 31, 2023

(65) Prior Publication Data
US 2024/0373119 A1    Nov. 7, 2024

(30) Foreign Application Priority Data
Feb. 28, 2022    (CN) .......................... 202210193723.2

(51) Int. Cl.
*H04N 5/335*    (2011.01)
*G06T 5/50*    (2006.01)
(Continued)

(52) U.S. Cl.
CPC ............ *H04N 23/632* (2023.01); *G06T 5/50* (2013.01); *G06V 40/174* (2022.01); *G06T 2207/20221* (2013.01)

(58) Field of Classification Search
CPC .................................................... H04N 23/632
See application file for complete search history.

(56) References Cited

U.S. PATENT DOCUMENTS

| | | | |
|---|---|---|---|
| 9,998,769 B1 * | 6/2018 | Fernandes | ........ H04N 21/23439 |
| 10,225,472 B2 * | 3/2019 | Kato | ...................... H04N 5/772 |
| 11,490,006 B2 | 11/2022 | Feng et al. | |

(Continued)

FOREIGN PATENT DOCUMENTS

| | | |
|---|---|---|
| CN | 109922266 A | 6/2019 |
| CN | 110096989 A | 8/2019 |

(Continued)

OTHER PUBLICATIONS

Sun Guoyu, "Principles and Design of Artificial Intelligence Dance Interaction System", Beijing: Communication University of China Press, Mar. 2020. pp. 15-18 and 142-147. With English Abstract.

*Primary Examiner* — Gary C Vieaux
(74) *Attorney, Agent, or Firm* — Conley Rose, P.C.

(57) ABSTRACT

This application provides a shooting method. The method may be applied to a terminal device that has a shooting capability, for example, a mobile phone or a network television. By implementing the method, the terminal device can perform image recognition and analysis on a video frame in a video shooting process, to determine a highlight video frame and generate a highlight photo. In this way, a user can simultaneously obtain a video and a highlight photo in the video in a video shooting process, thereby avoiding a problem that a highlight photo is difficult to be shot through manual capture or a problem that picture quality of a (Continued)

highlight photo captured from a shot video is low, reducing user operations, and improving user experience.

20 Claims, 29 Drawing Sheets

(51) Int. Cl.
*G06V 40/16* (2022.01)
*H04N 23/63* (2023.01)

(56) References Cited

U.S. PATENT DOCUMENTS

| | | |
|---|---|---|
| 12,003,850 B2 | 6/2024 | Lv et al. |
| 2003/0118329 A1* | 6/2003 | Obrador ............... G11B 27/102 |
| 2012/0182445 A1* | 7/2012 | You ........................ H04N 1/212 |
| | | 348/231.2 |
| 2013/0209056 A1* | 8/2013 | Kim ..................... H04N 9/8227 |
| | | 386/E5.069 |
| 2015/0082168 A1* | 3/2015 | Brieussel ............... G11B 27/28 |
| | | 715/716 |
| 2018/0075883 A1 | 3/2018 | Aroyo et al. |
| 2021/0382941 A1 | 12/2021 | Wu et al. |
| 2021/0409588 A1 | 12/2021 | Dong et al. |
| 2022/0038621 A1 | 2/2022 | Lee et al. |
| 2023/0262195 A1 | 8/2023 | Lei et al. |

FOREIGN PATENT DOCUMENTS

| | | |
|---|---|---|
| CN | 111061912 A | 4/2020 |
| CN | 111970440 A | 11/2020 |
| CN | 113472994 A | 10/2021 |
| CN | 113810608 A | 12/2021 |
| CN | 113923342 A | 1/2022 |
| EP | 3893495 A1 | 10/2021 |

* cited by examiner

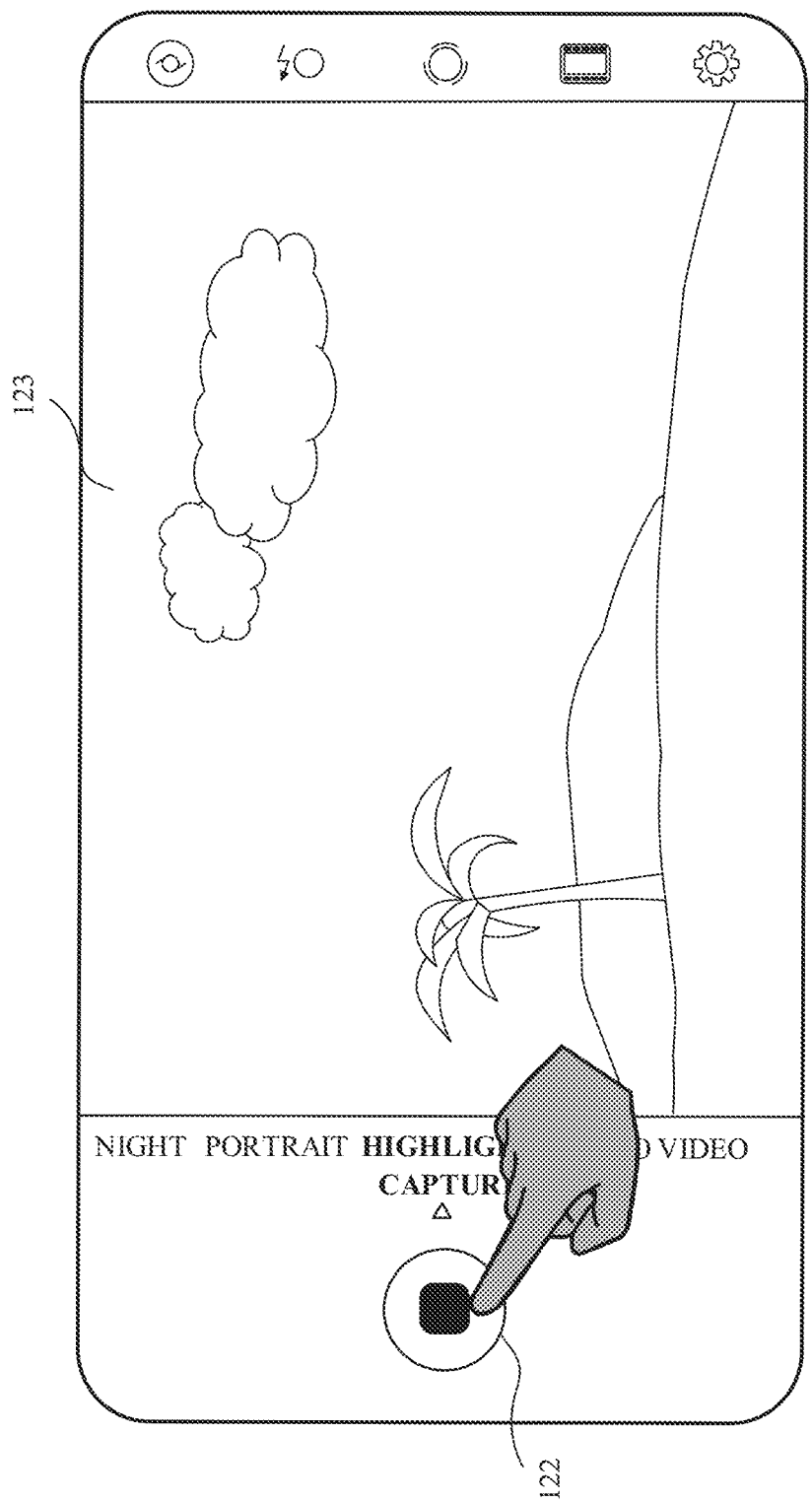

SHOOTING METHOD AND ELECTRONIC DEVICE FOR SAVING AN IMAGE FRAME FROM A VIDEO

CROSS-REFERENCE TO RELATED APPLICATIONS

This application is a U.S. National Stage of International Application No. PCT/CN2022/140204 filed on Dec. 20, 2022, which claims priority to Chinese Patent application Ser. No. 202210193723.2, filed with the China National Intellectual Property Administration on Feb. 28, 2022, both of which are incorporated herein by reference in their entireties.

TECHNICAL FIELD

This application relates to the terminal field, and in particular, to a shooting method and an electronic device.

BACKGROUND

Terminal devices such as mobile phones can shoot photos and videos. During photo shooting, a photo finally shot by a user is not an ideal photo of a specific moment due to a reflection delay and an action delay, especially in a capture scenario that has a high time requirement. In some scenarios, the user chooses to shoot a video first, then captures one or more frames from the video, and saves the one or more frames as photos. In this case, tedious operations are performed by the user to obtain the photos, and this affects user experience. In addition, picture quality of the photos obtained by capturing the video frames from the video is lower, which also degrades user experience.

SUMMARY

Embodiments of this application provide a shooting method. The method may be applied to a terminal device that has a shooting capability, for example, a mobile phone or a network television. By implementing the method, the terminal device can perform image recognition and analysis on a video frame in a video shooting process, to determine a highlight video frame and generate a highlight photo.

According to a first aspect, this application provides a shooting method, applied to a terminal device that includes a camera. The method includes: displaying a preview interface, where the preview interface includes a first control; detecting, at a first moment, a first operation performed on the first control, and starting recording of a first video; displaying a recording interface of the first video, where the recording interface includes a second control; detecting, at a second moment, a second operation performed on the second control, and ending the recording of the first video; and saving the first video and a first image frame, where the first video includes a second image frame obtained by processing a first image collected by the camera at a third moment, the third moment is between the first moment and the second moment, the first image frame is obtained by processing the first image, and that the first image frame is obtained by processing the first image includes: determining that a first target object in the first image meets a first preset condition; and processing the first image to obtain the first image frame.

By implementing the method provided in the first aspect, the terminal device can record a video, and identify a highlight image in a video recording process, to obtain and display a highlight photo corresponding to the highlight image. In this way, a user can simultaneously obtain the video and the highlight photo in the video recording process by performing a video recording operation, thereby avoiding a tedious manner of capturing a highlight photo in a video recording process or capturing a highlight photo from a video.

With reference to the embodiment provided in the first aspect, in some embodiments, resolution of the first image frame is the same as or higher than resolution of the second image frame.

By implementing the method provided in the foregoing embodiment, the highlight photo obtained by the terminal device in the recording process is equivalent to a photo shot by the user by using a common shooting method, has high resolution, for example, is a 4K photo, and is not a low-resolution photo captured from the recorded video, for example, is not a 1080*1920 photo. In this way, in the video and the photo obtained by the user through video recording, image quality of the photo is higher than or equal to quality of one image frame in the video, a shooting effect of the photo is ensured, and the image quality of the photo is not degraded due to simultaneous video shooting.

With reference to the embodiment provided in the first aspect, in some embodiments, interval duration between the first moment and the second moment is first duration, and the first duration is greater than 10 seconds.

By implementing the method provided in the foregoing embodiment, the terminal device determines a length or duration of the recorded video based on a requirement of the user, for example, the length of the recorded video is 30 seconds, 1 minute, 2 minutes, 10 minutes, or even longer. In the recording process, the terminal device can determine a magic moment and save a highlight photo while saving the video. In this way, even if a time period of the recorded video is long, the user can also obtain a highlight photo while saving and obtaining the video, without requiring a long time for processing and analysis. This is why the terminal device has no limit on duration of video recording.

With reference to the embodiment provided in the first aspect, in some embodiments, the first control is the same as or different from the second control.

With reference to the embodiment provided in the first aspect, in some embodiments, the recording interface further includes a third control, and the method further includes: detecting, at a fourth moment, a third operation performed on the third control, and determining a third image frame, where the fourth moment is between the first moment and the second moment, the third image frame is obtained by processing a second image collected by the camera at the fourth moment, and the saving the first video and a first image frame includes: saving the first video, the first image frame, and the third image frame.

By implementing the method provided in the foregoing embodiment, in addition to determining, according to a preset rule, whether an image collected by the camera is a highlight image, in the recording process, the terminal device can further determine, based on a shooting operation of the user, a highlight image desired by the user, to obtain a highlight photo. For the user, the user can shoot a desired image at a current moment by using a specific control at any time in the video recording process, and save the image as a photo.

With reference to the embodiment provided in the first aspect, in some embodiments, before the first moment, the method further includes: displaying a settings interface, where the settings interface includes: a first option and a plurality of second options, the first option is used to indicate the first target object, and the plurality of second options correspond to the first target object and indicate a plurality of actions performed by the first target object.

By implementing the method provided in the foregoing embodiment, the terminal device can record in advance a target object and an action that are set by the user, namely, a magic moment set by the user. In this way, a highlight photo automatically generated by the terminal device in the video recording process can better meet the requirement of the user.

With reference to the embodiment provided in the first aspect, in some embodiments, the first image frame and the third image frame are image frames that have clear picture quality and meaningful image content and that are collected by the camera between the first moment and the second moment, and the meaningful image content of the image frame refers to that the image frame includes the first target object and/or one or more actions corresponding to the first target object.

With reference to the embodiment provided in the first aspect, in some embodiments, the method further includes: displaying a display interface, where the display interface includes a thumbnail of the first video; and detecting a fourth operation performed on the thumbnail, and displaying the first video, the first image frame, and the third image frame.

With reference to a user interface shown in FIG. 3A, by implementing the method provided in the foregoing embodiment, the terminal device can first display the shot video. When the video is played, the photo generated in the process of recording the video is displayed.

With reference to the embodiment provided in the first aspect, in some embodiments, the method further includes: displaying a display interface, where the display interface includes a thumbnail of the first video, a thumbnail of the first image frame, and a thumbnail of the third image frame.

With reference to a user interface shown in FIG. 3D, by implementing the method provided in the foregoing embodiment, the terminal device can alternatively simultaneously display the video and the photo that are shot. In this way, the user can intuitively obtain the video or the photo at a time, thereby facilitating subsequent use of the video or the photo by the user and reducing user operations.

With reference to the embodiment provided in the first aspect, in some embodiments, the determining that a first target object in the first image meets a first preset condition specifically includes: determining that the first image includes the first target object and that the first target object performs a preset action, where the first target object includes a character, and the preset action is any one of jumping up, running, hurdling, shooting, and making a V gesture; and/or determining that the first image includes the first target object and that an expression of the first target object meets a preset expression, where the first target object includes a character, and the preset expression includes any one of smiling, laughing, smiling with eyes closed, blinking, and pouting; and/or determining that definition in picture quality of the first image is greater than a preset value.

By implementing the method provided in the foregoing embodiment, the terminal device can determine, from images collected by the camera, an image frame that includes a target object and in which the target object performs a specific preset action or has a preset expression or an image frame whose image definition exceeds a specific standard. The terminal device can determine that the foregoing image frame is a highlight image frame, and then generate a highlight photo.

With reference to the embodiment provided in the first aspect, in some embodiments, the determining that the first image includes the first target object and that the first target object performs a preset action specifically includes: when a comprehensive score of the first image is higher than a first threshold, determining that the first image includes the first target object and that the first target object performs the preset action, where the comprehensive score includes an image quality score ImageQualityScore, a portrait score FaceScore, and an action score ActionScore, ImageQualityScore is used to evaluate definition in picture quality of an image, FaceScore is used to evaluate a status of the first target object in the first image, and ActionScore is used to evaluate a degree of completion of the preset action of the first target object in the first image.

By implementing the method provided in the foregoing embodiment, the terminal device can determine whether image content of one image frame is highlight content by detecting image quality (definition) of the image frame, whether the image includes a target object and a status of the target object, and whether the target object performs an action and a degree of completion of the action, to further determine whether the image frame is a highlight image desired by the user.

With reference to the embodiment provided in the first aspect, in some embodiments, higher ImageQualityScore corresponds to higher definition of the first image; FaceScore=0 is used to indicate that the first image does not include the first target object, and FaceScore>0 is used to indicate that the first image includes the first target object and that the first target object smiles and/or opens eyes; and ActionScore=0) is used to indicate that the first target object does not perform an action. ActionScore>0) is used to indicate that the first target object performs an action, and higher ActionScore indicates a higher degree of completion of the action.

With reference to the embodiment provided in the first aspect, in some embodiments, if FaceScore=0) and ActionScore=0, the first threshold is a first value M1; if FaceScore=0 and ActionScore≠0, the first threshold is a second value M2, or if FaceScore≠0 and ActionScore≠0, the first threshold is a third value M0.

By implementing the method provided in the foregoing embodiment, the terminal device can set, based on different situations, a specific value of the first threshold used to determine whether an image is a highlight image, to enrich types (whether the highlight image includes a target object and whether the target object performs an action) of highlight images determined according to the preset rule, that is, to enrich image content of obtained highlight photos, thereby meeting various shooting scenarios.

With reference to the embodiment provided in the first aspect, in some embodiments, M1<M2<M0.

With reference to the embodiment provided in the first aspect, in some embodiments, after it is determined that the comprehensive score of the first image is higher than the first threshold, the method further includes: determining that the first image is not similar to a third image, where the third image is an image collected by the camera at a fifth moment, the fifth moment is between the first moment and the second moment, and the fifth moment is different from the third moment; or determining that the first image is similar to a third image, but the comprehensive score of the first image is higher than that of the third image.

By implementing the method provided in the foregoing embodiment, after the terminal device determines that the image frame meets the preset rule used to determine whether the image frame is a highlight image frame, the terminal device further determines whether the image frame is a duplicate of a previously determined highlight image frame, that is, determines whether similarity between image content of the two image frames is extremely high. In this case, when determining that the image frame is not similar to the another image frame, the terminal device can determine that the image frame is a highlight image frame. When it is determined that the image frame is similar to the another image frame, if a comprehensive score of the image frame is higher, it is determined to output the image frame as a highlight photo, and the another image frame similar to the image frame is no longer output.

With reference to the embodiment provided in the first aspect, in some embodiments, the processing the first image to obtain the first image frame specifically includes: determining N image frames adjacent to the first image; and fusing the first image and the N image frames to obtain the first image frame.

By implementing the method provided in the foregoing embodiment, when generating a photo based on a specific image frame collected by the camera, the terminal device can fuse, based on several image frames before and after the image, the image frame and the several image frames before and after the image, to obtain a final highlight photo. In this way, the finally output highlight photo can have higher definition, lower noise, a better color effect, and the like.

According to a second aspect, this application provides an electronic device. The electronic device includes one or more processors and one or more memories. The one or more memories are coupled to the one or more processors, the one or more memories are configured to store computer program code, the computer program code includes computer instructions, and when the one or more processors execute the computer instructions, the electronic device is enabled to perform the method described in the first aspect and any possible implementation of the first aspect.

According to a third aspect, this application provides a computer-readable storage medium, including instructions. When the instructions are run on an electronic device, the electronic device is enabled to perform the method described in the first aspect and any possible implementation of the first aspect.

According to a fourth aspect, this application provides a computer program product including instructions. When the computer program product runs on an electronic device, the electronic device is enabled to perform the method described in the first aspect and any possible implementation of the first aspect.

It can be understood that the electronic device provided in the second aspect, the computer storage medium provided in the third aspect, and the computer program product provided in the fourth aspect are all configured to perform the method provided in this application. Therefore, for beneficial effects that can be achieved by the electronic device, the computer storage medium, or the computer program product, refer to the beneficial effects in the corresponding method. Details are not described herein again.

BRIEF DESCRIPTION OF DRAWINGS

FIG. 1A-FIG. 1J are schematic diagrams of a group of user interfaces in a shooting process according to an embodiment of this application;

DESCRIPTION OF EMBODIMENTS

Figure 1A:
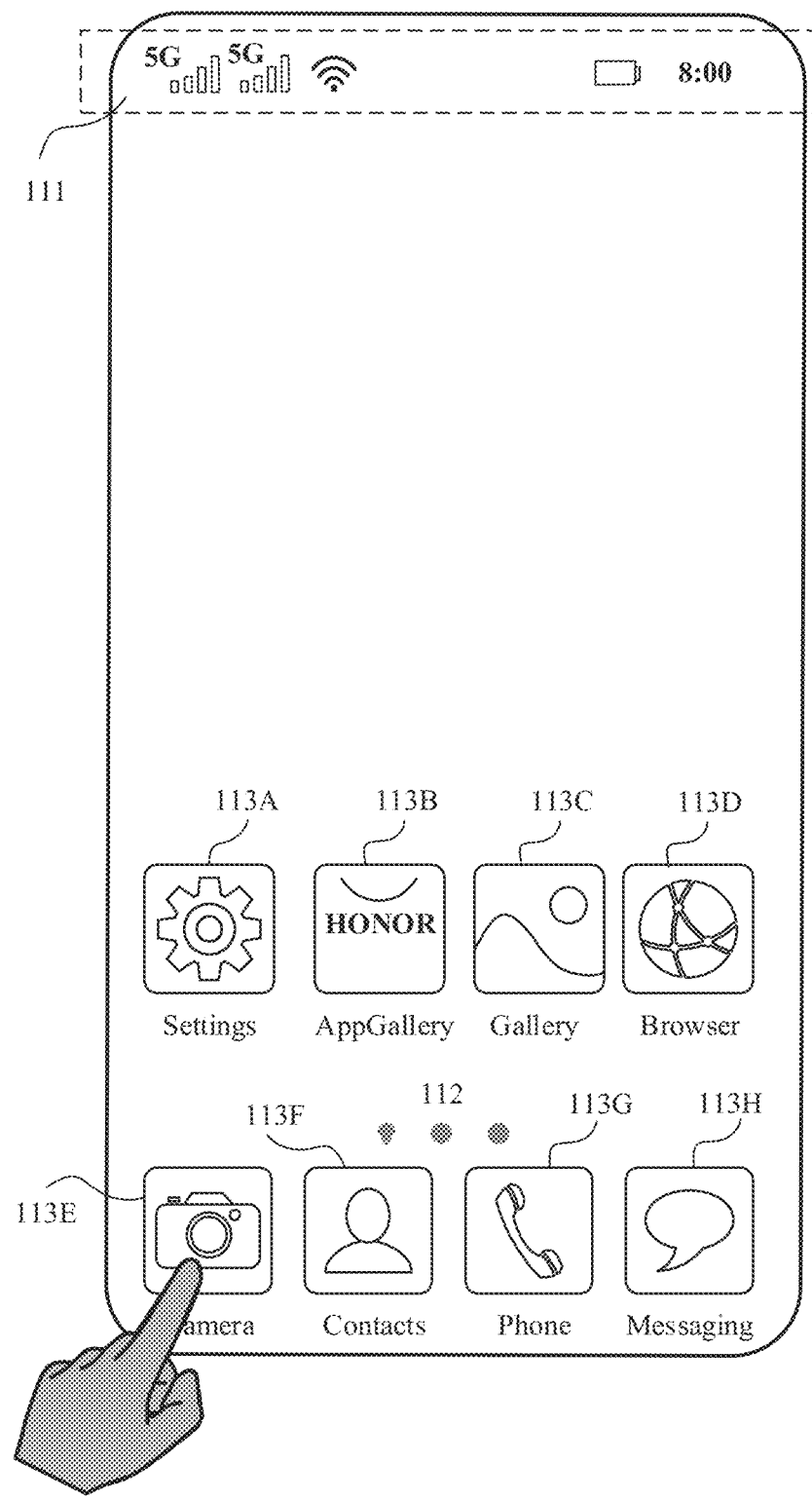

Terms used in the following embodiments of this application are merely intended to describe specific embodiments, but not intended to limit this application.

Terminal devices such as mobile phones can shoot photos and videos. During photo shooting, a photo finally shot by a user is not an ideal photo of a specific moment due to a reflection delay and an action delay, especially in a capture scenario that has a high time requirement. In some scenarios, the user chooses to shoot a video first, then captures one or more frames from the video, and saves the one or more frames as photos. In this case, tedious operations are performed by the user to obtain the photos, and this affects user experience. In addition, picture quality of the photos obtained by capturing the video frames from the video is lower, which also degrades user experience.

Therefore, an embodiment of this application provides a shooting method. The method may be applied to a terminal device that has a shooting capability, for example, a mobile phone or a network television.

By implementing the method, the terminal device can perform image recognition and analysis on a video frame of a processed stream in a video shooting process, and determine a highlight video frame in the processed stream. The processed stream is a video stream that is obtained by downsampling an original stream and that is used for image calculation. Image calculation such as image recognition and image analysis performed by using the processed stream can reduce time costs and storage costs of image calculation, and improve calculation efficiency. The original stream is a video stream collected by an actual camera. Usually a data volume of the original stream is large and is not suitable for complex image calculation.

The foregoing highlight video frame is a video frame with high picture quality and meaningful image content. Indicators used to evaluate image picture quality include but are not limited to definition, noise, and a color. Therefore, the high picture quality includes high picture definition, low image noise, a calibrated color, and the like. The meaningful image content refers to that an image has explicit image content, for example, a character or an animal. Preferably, the explicit image content further includes a character who smiles with eyes opened or a character who smiles, laughs, smiles with eyes closed, blinks, or pouts. Further, the meaningful image content refers to that the image content performs a specific preset action, for example, the character is jumping up, an athlete is hurdling, or a dog is running. For an image that does not include a character and an animal that can perform specific actions, the meaningful image content alternatively includes a plant, a complete and upright building, or the like.

After determining the highlight video frame in the processed stream, the terminal device may determine a video frame that corresponds to the highlight video frame and that is in the original stream, and denote the video frame as an original highlight video frame. Then, the terminal device may obtain a highlight photo based on the original highlight video frame. The terminal device may display the highlight photo after shooting is completed.

In this way, a user can simultaneously obtain a video and a highlight photo in the video in a video shooting process. In this way, a user can avoid a problem that a highlight photo is difficult to be shot through manual capture or a problem that picture quality of a highlight photo captured from a shot video is low, reducing user operations, and improving user experience.

In the following, FIG. 1A-FIG. 1G show examples of a group of user interfaces for implementing the shooting method provided in this embodiment of this application.

In the user interfaces shown in FIG. 1A-FIG. 1G, a terminal device (denoted as a terminal device 100) that implements the shooting method is a mobile phone. Certainly, in addition to a mobile phone or a tablet computer, the terminal device 100 may alternatively be a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality. AR) device, a virtual reality (virtual reality. VR) device, an artificial intelligence (artificial intelligence, AI) device, a wearable device, a vehicle-mounted device, a smart home device, and/or a smart city device. A specific type of the terminal device 100 is not specially limited in this embodiment of this application.

First, FIG. 1A shows an example of a homepage (homepage) of a mobile phone.

As shown in FIG. 1A, the homepage may include a status bar 111, a page indicator 112, and a plurality of application icons.

The status bar may include one or more signal strength indicators of a mobile communication signal (which may also be referred to as a cellular signal), a wireless fidelity (wireless fidelity, Wi-Fi) signal strength indicator, a battery status indicator, a time indicator, and the like.

The page indicator 112 may be used to indicate a location relationship between a currently displayed page and another page.

The plurality of application icons may include a settings application icon 113A, an AppGallery application icon 113B, a gallery application icon 113C, a browser application icon 113D, a camera application icon 113E, a contacts application icon 113F, a phone application icon 113G, a messaging application icon 113H, and the like. In addition to the foregoing icons, the homepage may further include another application icon. Details are not described herein again. The plurality of application icons may be distributed on a plurality of pages. The page indicator 112 may be used to indicate which of the plurality of pages hosting the plurality of applications is the one that a user is currently browsing. The user may browse another page by performing a touch operation of swiping left and right.

It can be understood that the user interface in FIGS. 1A and 1n subsequent descriptions of FIG. 1A is merely used as an example of a possible user interface style of the terminal device 100 that uses the mobile phone as an example, and should not constitute a limitation on this embodiment of this application.

Figure 1B:
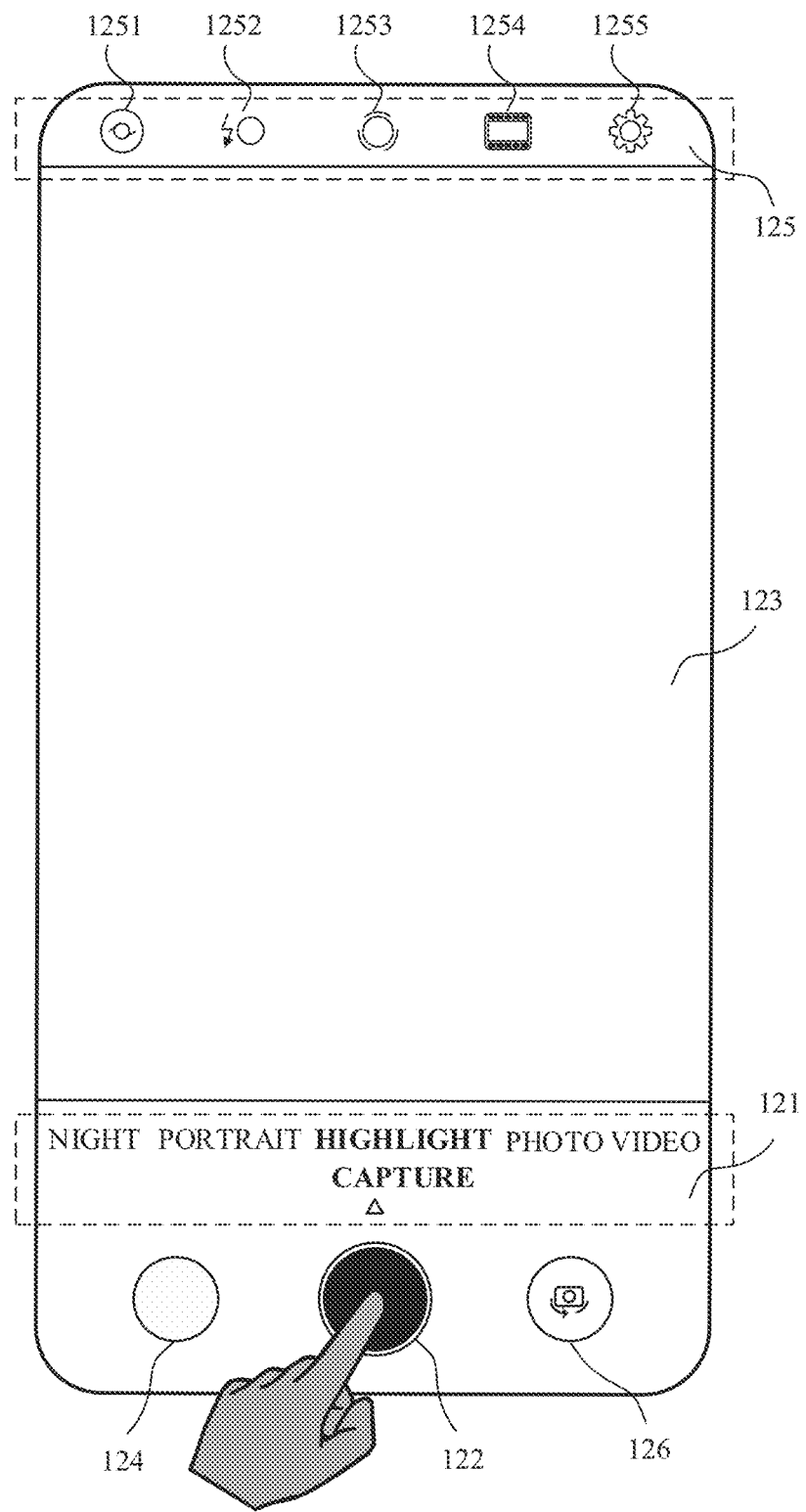

The terminal device 100 may detect a user operation performed by the user on the camera application icon 113E. In response to the foregoing operation, the terminal device 100 may display the user interface shown in FIG. 1B. FIG. 1B shows an example of a user interface provided by the terminal device 100 for shooting.

As shown in FIG. 1B, the user interface may include a menu bar 121, a shooting control 122, a preview window 123, and a playback control 124.

A plurality of shooting mode options may be displayed in the menu bar 121, for example, "NIGHT", "PORTRAIT", "PHOTO", and "VIDEO". The "NIGHT" mode may be used to shoot a photo in a scenario with dim light, for example, at night. The "PORTRAIT" mode may be used in a shooting scenario in which a shooting object is a character.

In this embodiment of this application, the menu bar 121 further includes a "HIGHLIGHT CAPTURE" mode. The "HIGHLIGHT CAPTURE" mode corresponds to the shooting method provided in this embodiment of this application. In a video shooting process, a highlight video frame in a video stream is also determined, and the video frame is saved as a photo. The terminal device 100 may detect a leftward or rightward swiping operation performed by the user on the menu bar 121, to switch between shooting modes. Currently, a shooting mode determined by the terminal device 100 in the scenario shown in FIG. 1B is the "HIGHLIGHT CAPTURE" mode.

In the "HIGHLIGHT CAPTURE" mode, after detecting a user operation performed on the shooting control 122, the terminal device 100 may record a group of continuous image frames collected by a camera, and output the group of image frames as a video in a specific encoding format. The foregoing process may be referred to as video recording. The output video in the specific encoding format may be referred to as a target video. The group of image frames correspond to video frames included in the target video.

In a video recording process, the terminal device 100 may further display, in the preview window 123 in real time, the continuous image frames collected by the camera, namely, the video frames included in the target video. After video recording is completed, a thumbnail of the target video may be displayed in the playback control 124. Usually, the thumbnail is a thumbnail of a first image frame of the target video.

The user interface shown in FIG. 1B further includes a settings bar 125 and a switching control 126.

A plurality of shooting parameter controls may be displayed in the settings bar 125. One shooting control is used to adjust one type of parameters of the camera, thereby changing an image collected by the camera. For example, the shooting parameter controls such as "aperture" 1251, "flashlight" 1252, "auto-track" 1253, "filter" 1254, and "preference" 1255 may be displayed in the settings bar 125. The "aperture" 1251 may be used to adjust a size of an aperture of the camera, to change picture brightness of an image collected by the camera. The "flashlight" 1252 may be used to adjust and enable or disable a flashlight, and may also change the picture brightness of the image collected by the camera. The "auto-track" 1253 may be used to set a follow object for shooting, thereby affecting a viewfinder range of the camera. The "filter" 1254 may be used to adjust an image color.

The "preference" 1255 may be used to record user-defined settings. In this embodiment of this application, the "preference" 1255 may provide the user with a function of setting and identifying image content and an action. Details are specifically described in the subsequent embodiments and are not described herein. Influence of the shooting parameter controls on the image collected by the camera may be all displayed in the preview window 123 in real time.

The switching control 126 may be used to switch a viewfinder camera in use. If a camera currently used for image collection is a front-facing camera, when detecting a user operation performed on the switching control 126, the terminal device 100 may enable, in response to the operation, a rear-facing camera for image collection. Otherwise, if a camera currently used for image collection is the rear-facing camera, when detecting a user operation performed on the switching control 126, the terminal device 100 may enable, in response to the operation, the front-facing camera for image collection.

Figure 1C:
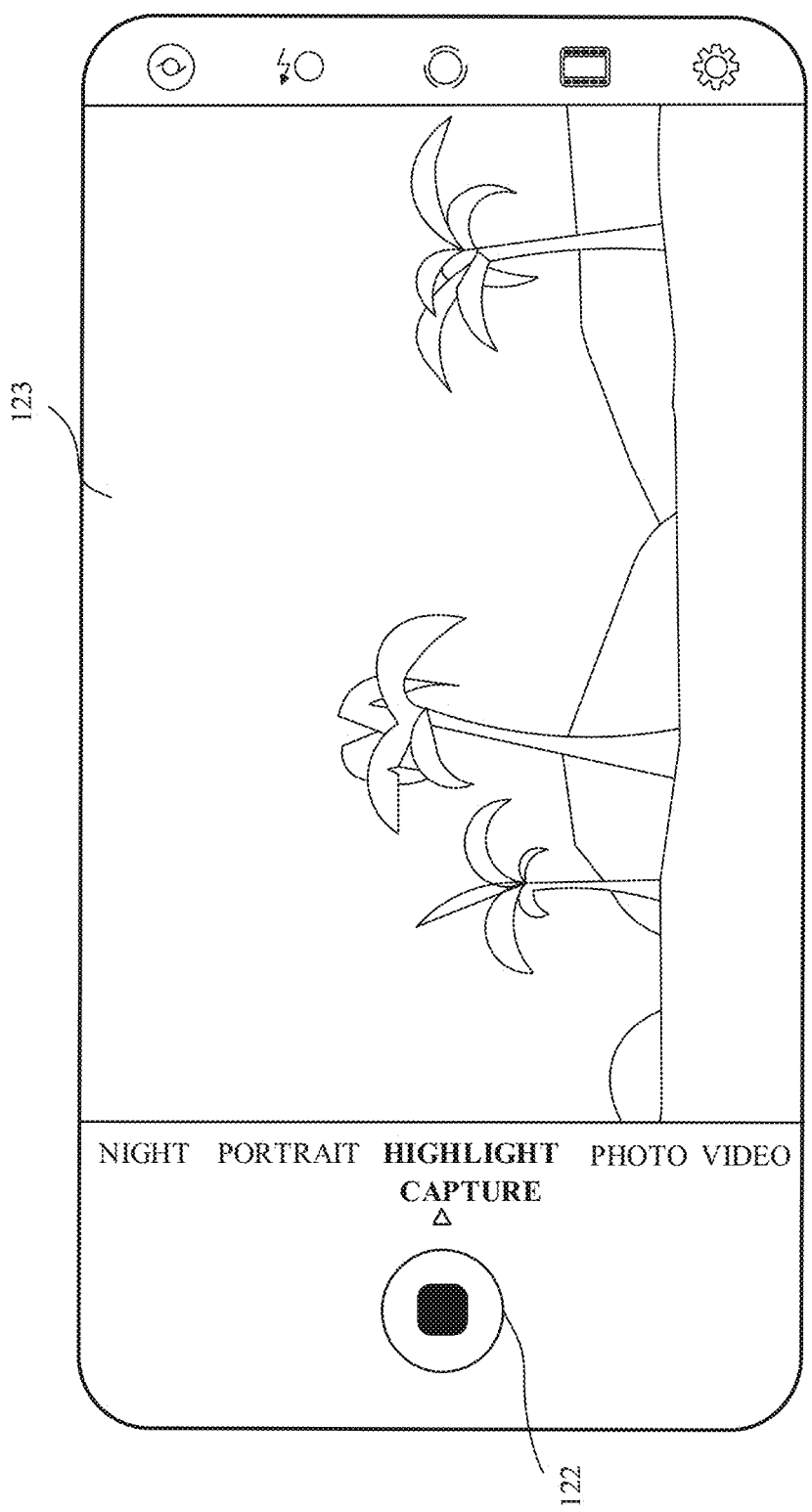
Figure 1E:
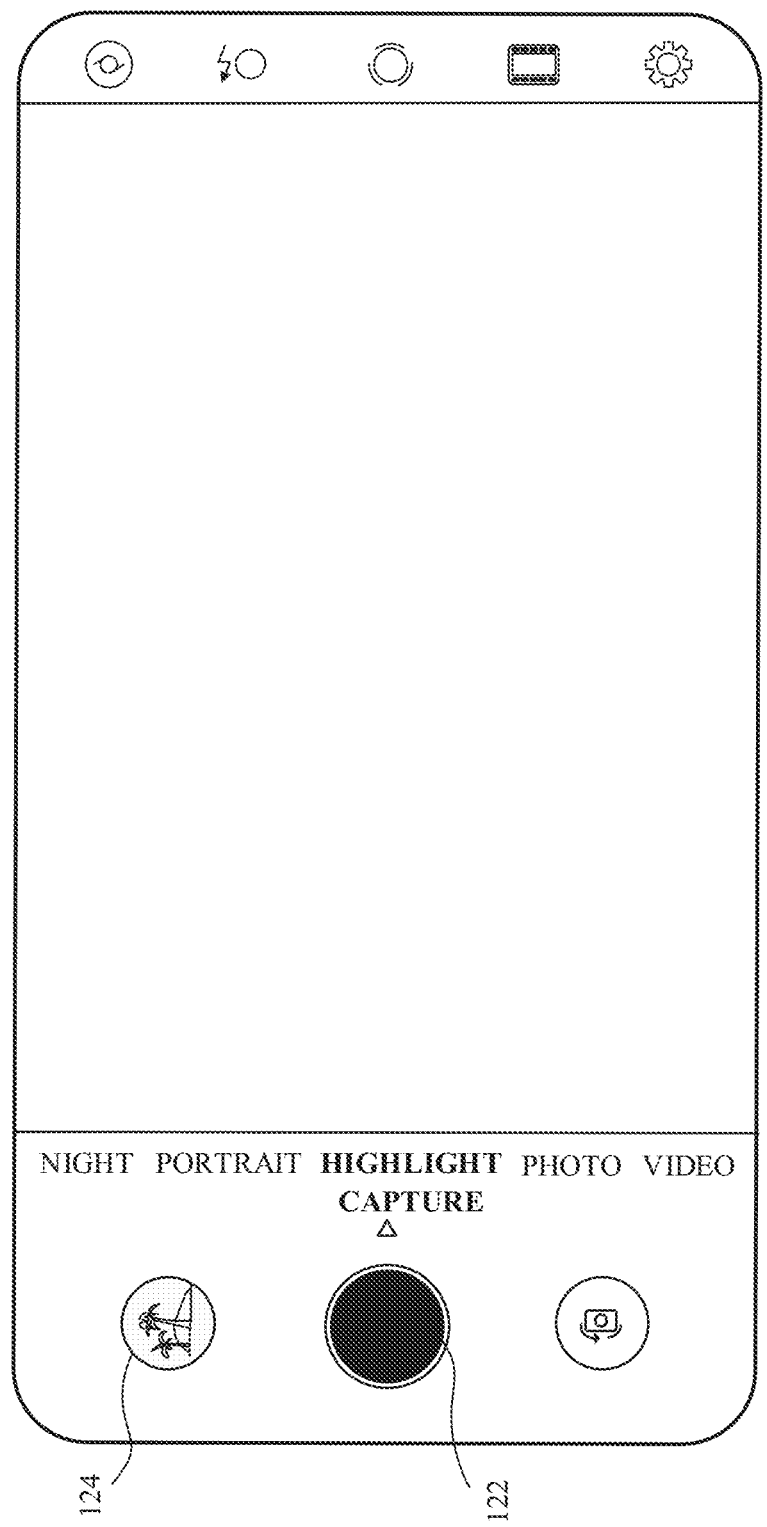

FIG. 1C-FIG. 1E show examples of a group of user interfaces in video recording performed in the "HIGHLIGHT CAPTURE" mode.

In the user interface shown in FIG. 1B, after detecting a user operation performed on the shooting control 122, the terminal device 100 may start video recording, as shown in FIG. 1C. When starting video recording, the terminal device 100 may change a style of the shooting control 122 into a style of the shooting control 122 shown in FIG. 1C. The shooting control 122 in FIG. 1C may prompt the user that video recording is already started.

An image frame collected by the camera may be displayed in the preview window 123 in real time. In this case, the preview window 123 shows an example of one image frame collected by the camera at a current moment (a moment at which it is detected that the shooting control 122 is operated to start shooting). The image frame displayed in the preview window 123 may be denoted as an image frame A1. The image frame A1 may be the first image frame of a video (the target video) obtained after recording.

The terminal device 100 may detect, again at a specific moment after recording starts, a user operation performed on the shooting control 122. In response to the operation, the terminal device 100 may stop recording, as shown in FIG. 1D. In this case, an image frame displayed in the preview window 123 may be denoted as an image frame A2. The image frame A2 may be the last image frame of the target video.

As shown in FIG. 1E, the style of the shooting control 122 in FIG. 1B may be resumed after the recording stops. In addition, a thumbnail of the saved video may be displayed in the playback control 124. For example, an image displayed in the playback control 124 is a thumbnail of the image frame A1, namely, the thumbnail of the first image frame of the recorded video.

The terminal device 100 may detect a user operation performed on the playback control 124. In response to the operation, the terminal device 100 may play the recorded target video.

Figure 1F:
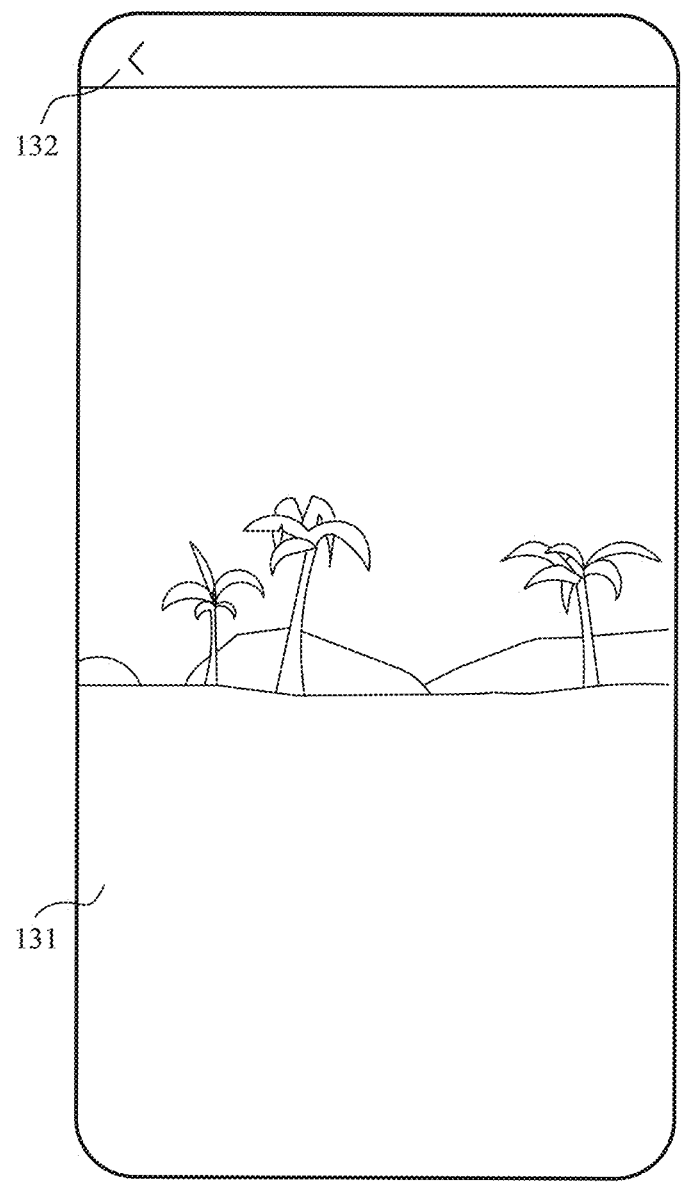

FIG. 1F shows an example of a user interface obtained when the terminal plays the target video.

After detecting the user operation performed on the playback control 124, the terminal device 100 may display the user interface shown in FIG. 1F. The interface includes a window 131. The window 131 may be used to play the target video. The interface may further include a control 132. When detecting a user operation performed on the control 132, the terminal device 100 may display the user interface shown in FIG. 1E.

Figure 1G:
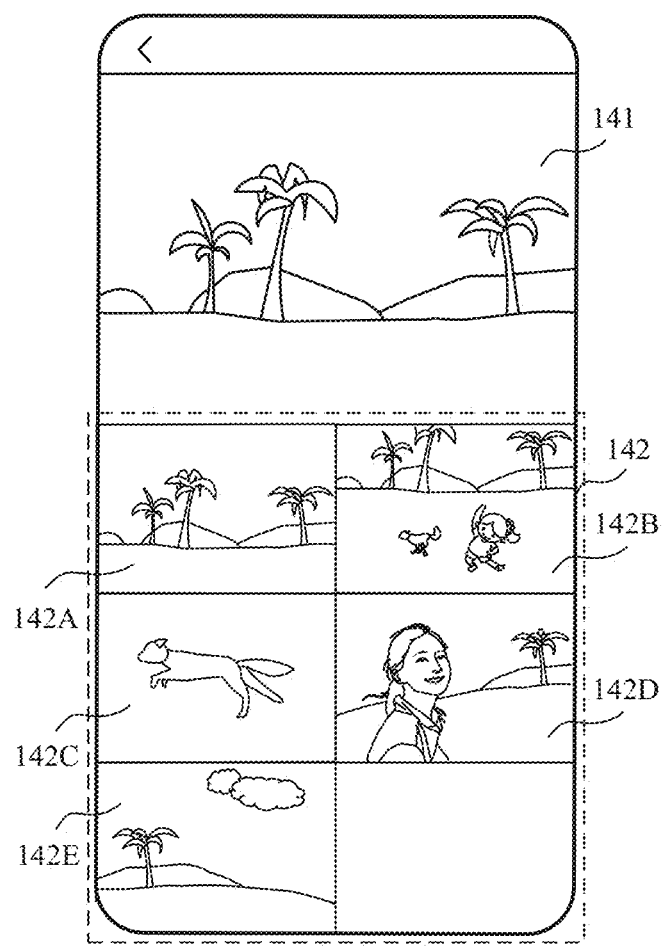

After the target video is played, the terminal device 100 may display the user interface shown in FIG. 1G. As shown in FIG. 1G, the interface may include a window 141 and a window 142. The window 141 may be used to play the target video. After detecting a user operation, for example, a tap operation, performed on the window 141, the terminal device 100 may play the target video in the window 141. The window 142 may be used to display one or more highlight pictures. The highlight pictures are screened by the terminal device 100 from the target video played in the window 141.

For example, five highlight photos screened from the target video played in the window 141, for example, a photo 142A, a photo 142B, a photo 142C, a photo 142D, and a photo 142E, are displayed in the window 142. Certainly, the terminal device 100 may alternatively screen more highlight photos from the target video, without being limited to five photos. Correspondingly, more highlight photos may also be displayed in the window 142.

In some embodiments, after detecting the user operation performed on the playback control 124, the terminal device 100 may directly display the user interface shown in FIG. 1G. In this way, the terminal device 100 can display the highlight photos screened from the target video while playing the target video for the first time. In addition, the user can directly obtain the highlight photos without waiting for a period of time for playing the target video once.

In some embodiments, the terminal device 100 may alternatively perform video shooting in the conventional "VIDEO" mode. In the foregoing recording process, the terminal device 100 may also identify a highlight video frame in the video stream, and then generate a highlight photo.

Preferably, the terminal device 100 may display a dialog box when starting video shooting in the "VIDEO" mode, to determine whether to detect a magic moment in the video recording process, to generate a highlight photo.

Figure 1H:
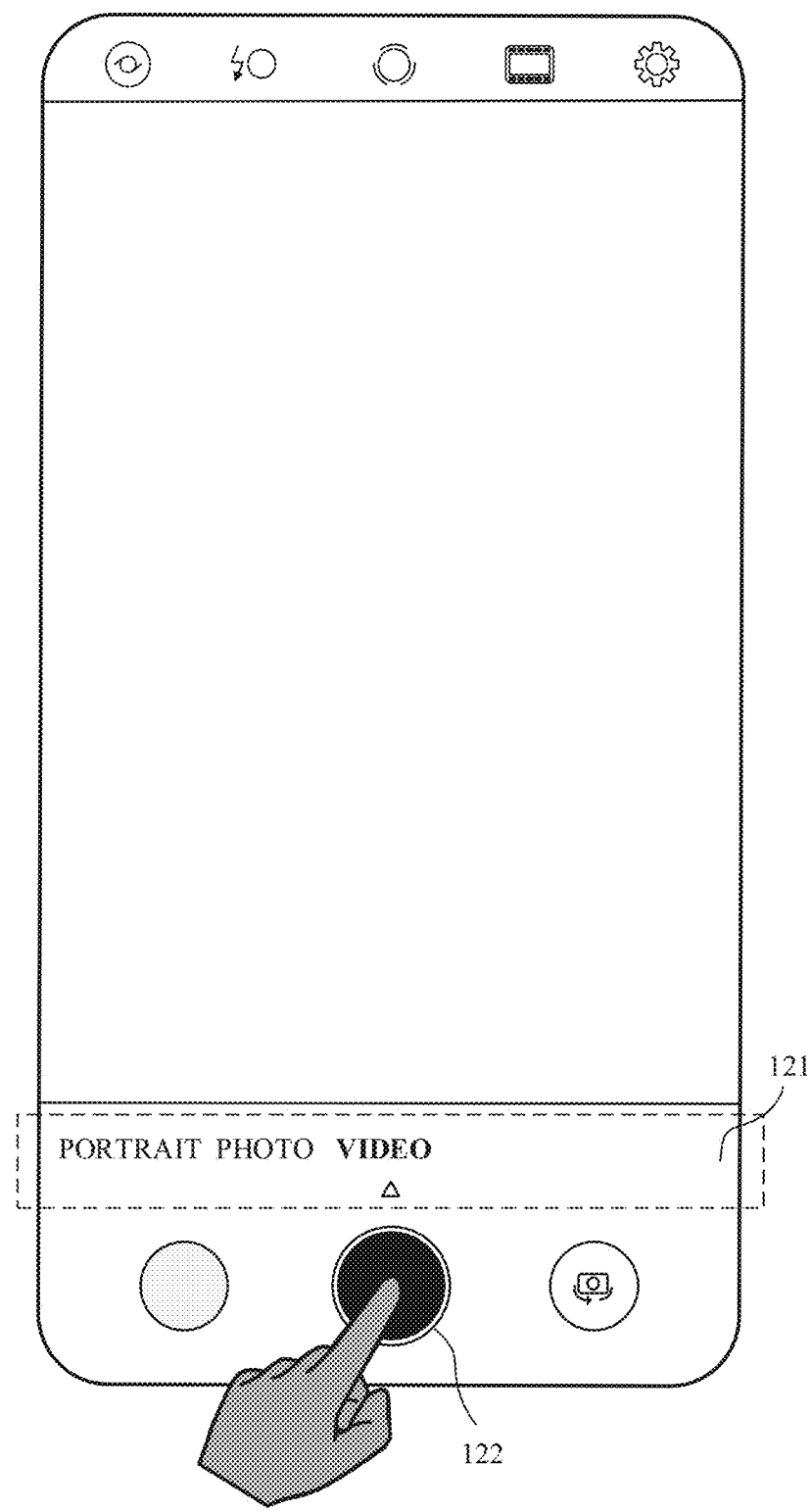
Figure 1I:
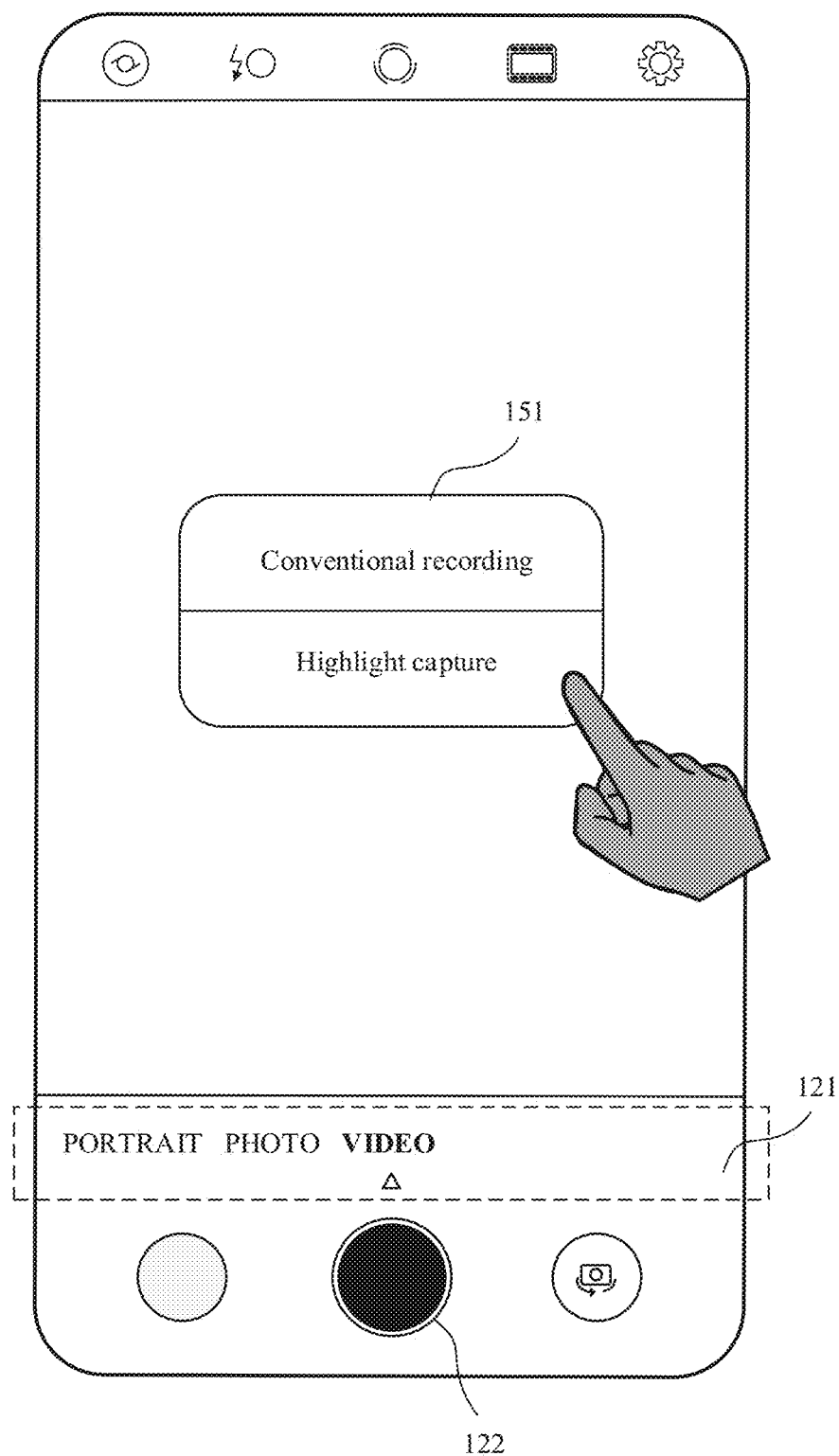

FIG. 1H shows an example of a user interface for video shooting in the "VIDEO" mode. In this case, after detecting the user operation performed on the control 122, the terminal device 100 may display a user interface shown in FIG. 1I. As shown in FIG. 1I, the user interface may include a dialog box 151. The dialog box 151 may include a "conventional recording" option and a "highlight capture" option.

If it is detected that the user selects the "highlight capture" option, the terminal device 100 may identify a magic moment in the recording process in real time, and generate and display a highlight photo after the recording ends. Otherwise, if it is detected that the user selects the "conventional recording" option, the terminal device 100 does not identify a magic moment in real time, and correspondingly, the terminal device 100 does not generate and display a highlight photo. In this way, the terminal device 100 can save calculation resources when the user wants to shoot only a conventional video.

In some embodiments, when the terminal device 100 ends video shooting in the "VIDEO" mode, the dialog box may be displayed, to avoid missing a shooting start time determined by the user.

In some embodiments, the terminal device 100 may alternatively identify a magic moment based on a preference of the user, and then generate a corresponding highlight photo.

As shown in FIG. 1B, the terminal device 100 may detect a user operation performed on the "preference" control 1255. In response to the operation, the terminal device 100 may display a user interface shown in FIG. 1J. A plurality of image content options and action options, for example, image content options such as "character", "dog", and "cat", and action options such as "jump up", "run", and "hurdle", may be displayed in the interface. Different image content may correspond to different actions.

The terminal device 100 may detect user operations performed by the user to select one or more image content options and one or more action options. In this case, when identifying the foregoing image content and/or action, the terminal device 100 determines that this moment is a magic moment, for example, determines that a moment at which a character jumps up or a moment at which a character runs is a magic moment.

In some embodiments, in the video recording process corresponding to the "HIGHLIGHT CAPTURE" mode, the terminal device 100 further supports highlight photo capture based on a user operation. FIG. 2A-FIG. 2F show examples of a group of user interfaces in highlight photo capture performed based on user operations.

Figure 2A:
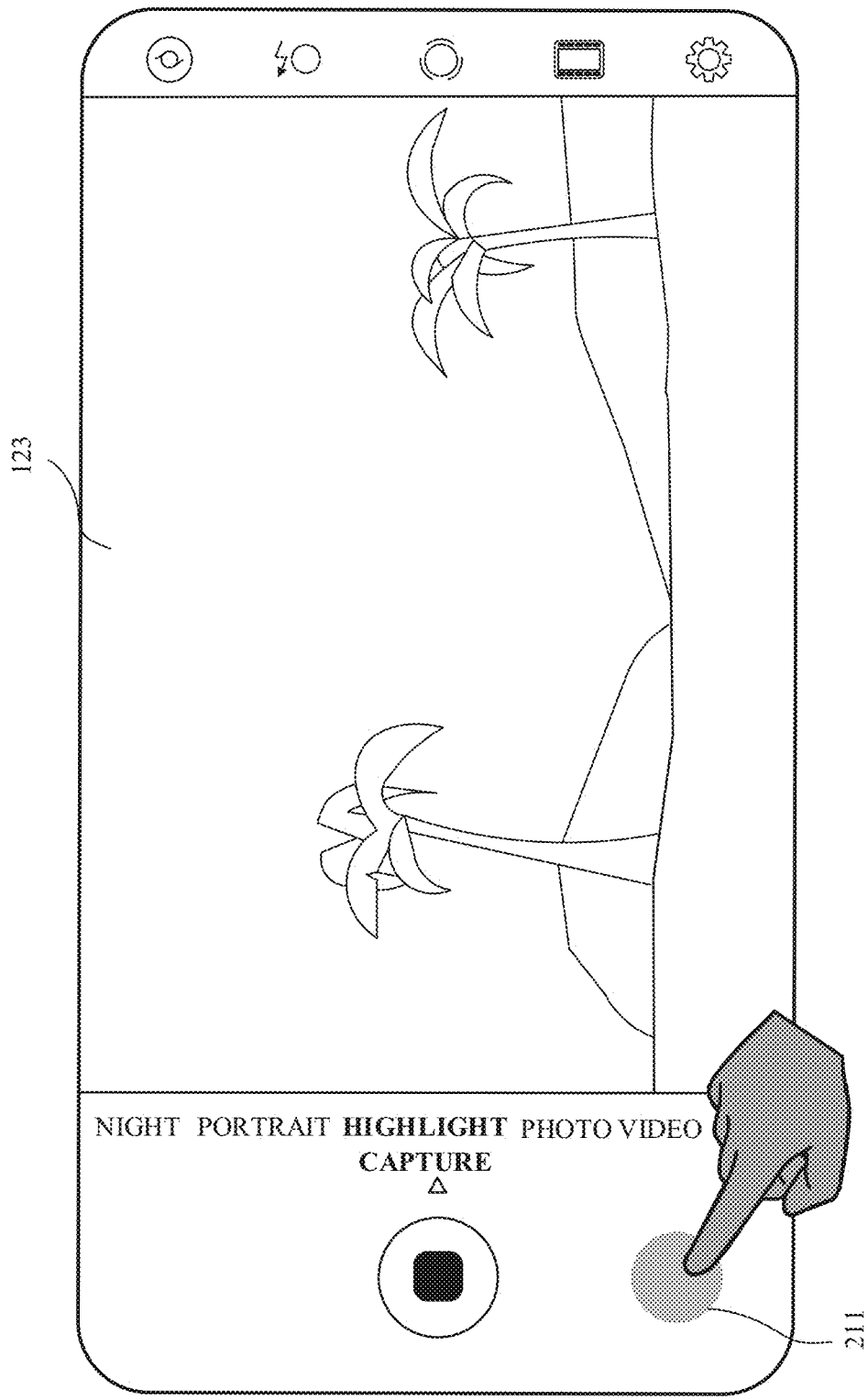
FIG. 2A-FIG. 2F are schematic diagrams of another group of user interfaces in a shooting process according to an embodiment of this application.

FIG. 2A shows an example of a user interface at a specific moment in a video recording process.

The specific moment may be a moment between a moment at which the terminal device 100 displays the user interface shown in FIG. 1C and a moment at which the terminal device 100 displays the user interface shown in FIG. 1D. In this case, an image frame displayed in the preview window 123 may be denoted as an image frame B1. The image frame B1 is one frame in the target video constituted by the image frame A1 (the first frame) and the image frame A2 (the last frame).

The user interface shown in FIG. 2A further includes a shooting control 211. The terminal device 100 may detect a user operation performed on the shooting control 211 while displaying the image frame B1. In response to the operation, the terminal device 100 may save a high-resolution image that is in the original stream and that corresponds to the image frame B1 as a highlight photo.

In some embodiments, in response to the operation, the terminal device 100 may further save a high-resolution image that is in the original stream and that corresponds to an image frame B2 as a highlight photo. The image frame B2 is the $n^{th}$ image frame before the image frame B1, for example, n=3.

Figure 2B:
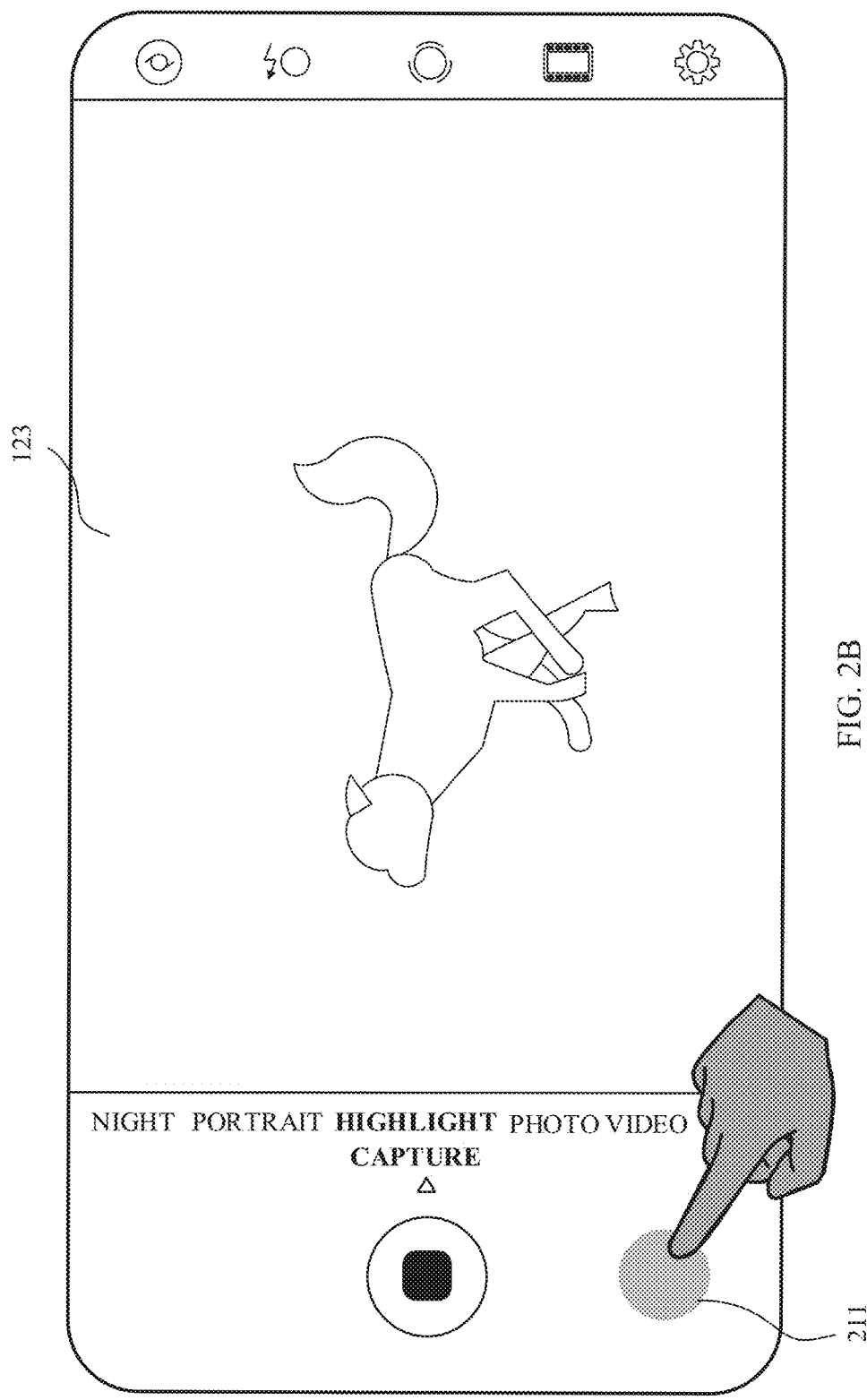

FIG. 2B shows an example of a user interface at another specific moment in the video recording process.

The moment may be a moment between a moment at which the terminal device 100 displays the user interface shown in FIG. 2A and a moment at which the terminal device 100 displays the user interface shown in FIG. 1D. In this case, an image frame displayed in the preview window 123 may be denoted as the image frame B2. The image frame B1 may be one frame between the image frame B1 and the image frame A2 (the last frame).

In this case, the terminal device 100 may also detect a user operation performed on the shooting control 211. In response to the operation, the terminal device 100 may save the image frame B2 as a highlight photo.

In the video recording process, the terminal device 100 may detect a plurality of user operations performed on the shooting control 211, and perform a photo shooting action to obtain a corresponding photo. FIG. 2A and FIG. 2B are merely schematic diagrams of examples of the user interfaces in two times of highlight photo shooting performed based on the user operations in the video recording process.

After video recording is completed, when the terminal device 100 displays an automatically generated highlight photo, the terminal device 100 may further display a highlight photo shot by the user. The automatically generated highlight photo is a highlight photo obtained after the terminal device 100 identifies a magic moment in the video recording process and then performs shooting. For example, the photos such as the photo 142A~the photo 142E shown in FIG. 1G may be referred to as automatically generated highlight photos. The highlight photo shot by the user is a photo obtained by the terminal device 100 by performing a shooting action in response to a user operation performed on the shooting control 211.

Figure 2C:
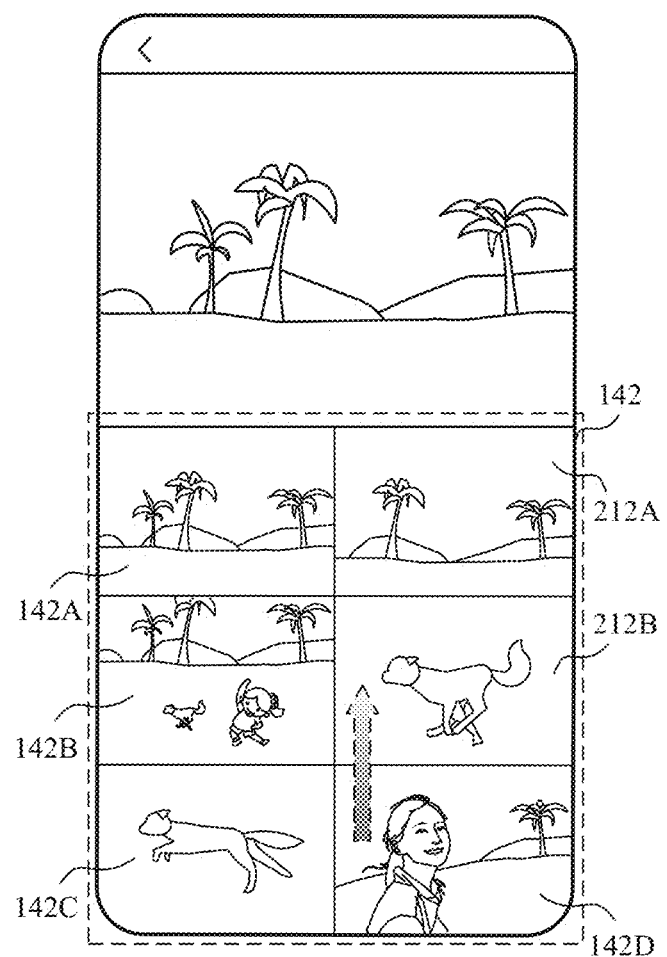

Specifically, FIG. 2C shows an example of a user interface of automatically generated highlight photos displayed by the terminal device 100 and highlight photos shot by the user. As shown in FIG. 2C, photos displayed in the window 142 in this case include: the automatically generated highlight photos displayed by the terminal device 100, for example, the photo 142A~the photo 142E; and the highlight photos shot by the user, for example, a photo 212A and a photo 212B.

When a quantity of highlight photos exceeds a quantity of photos that can be displayed in the window 142 at a time, the terminal device 100 may respond to a detected upward swiping or downward swiping operation performed by the user on the window 142, to display all the highlight photos. For example, the terminal device 100 does not display the photo 142E in the user interface shown in FIG. 2C. Therefore, based on the user interface shown in FIG. 2C, the terminal device 100 may display the highlight photo 142E after detecting the upward swiping operation performed on the window 142, as shown in FIG. 2D.

Figure 2D:
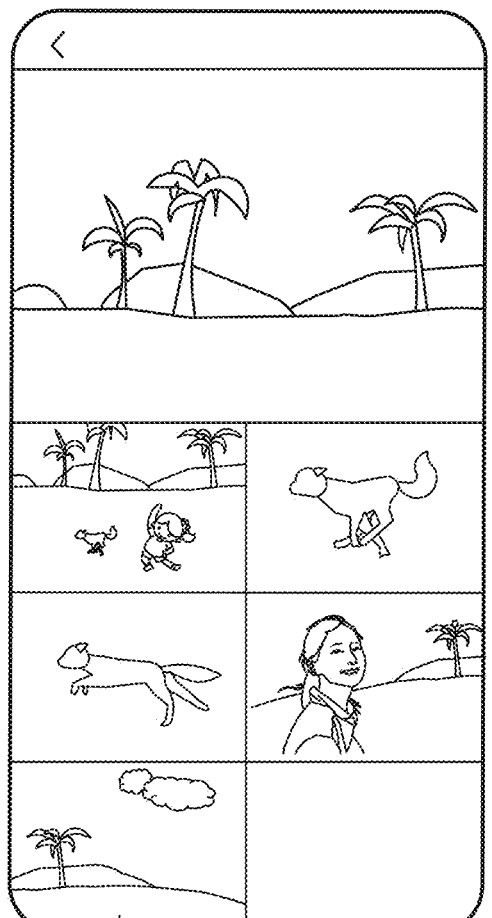

In the scenarios shown in FIG. 2C and FIG. 2D, the window 142 may arrange all of the highlight photos in a time sequence.

In some embodiments, the terminal device 100 may alternatively separately display the foregoing highlight photos based on the automatically generated highlight photos and the highlight photos shot by the user. In this way, the user can more intuitively distinguish between the automatically generated highlight photos and the highlight photos shot by the user.

Figure 2E:
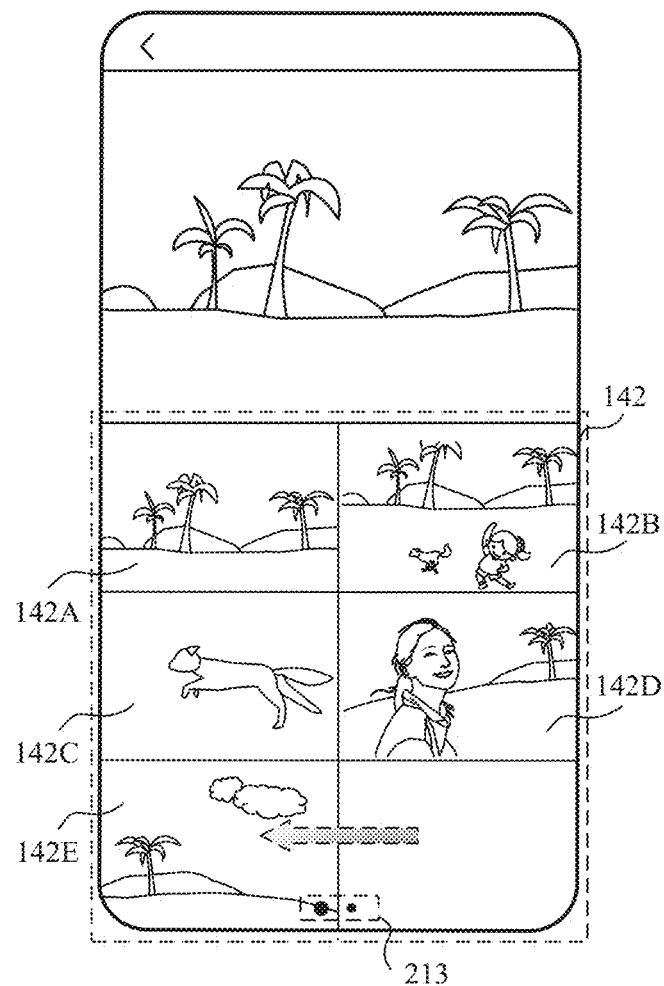

For example, with reference to the user interface shown in FIG. 2E, the terminal device 100 may first display all the automatically generated highlight photos in the window 142, including the photo 142A~the photo 142E. The user interface further includes a page indicator 213. The page indicator 213 may indicate a plurality of pages that can be displayed in the window 142. In this case, the page indicator 213 indicates a first page that is currently displayed by the terminal device 100 in the window 142. The first page is a page that displays all the automatically generated highlight photos and that is in the window 142.

Figure 2F:
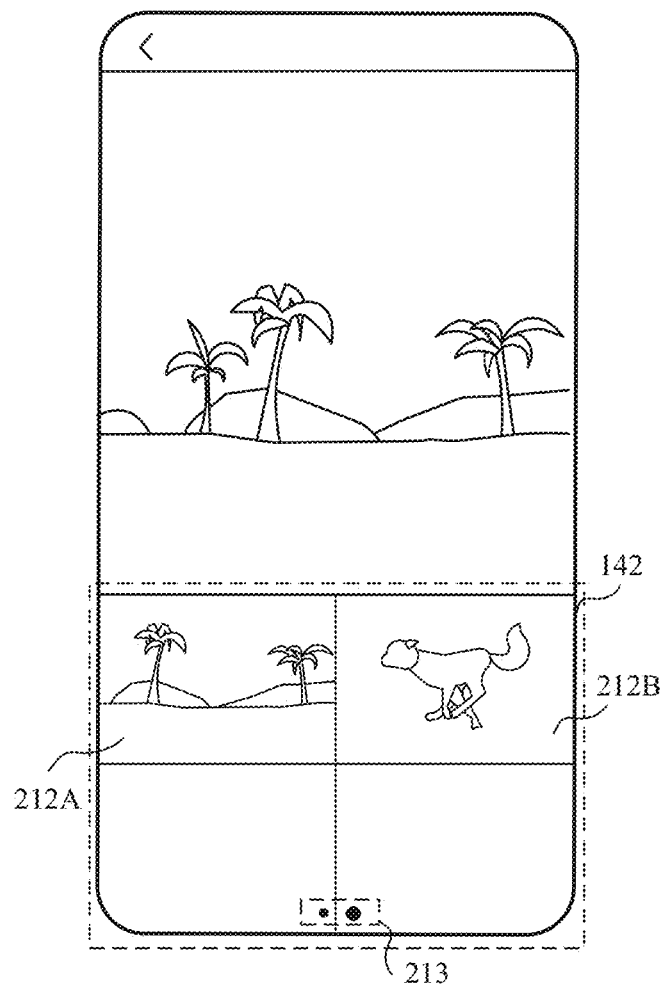

The terminal device 100 may detect a leftward swiping operation performed on the window 142. As shown in FIG. 2F, the terminal device 100 may display, in the window 142 in response to the foregoing operation, all the highlight photos shot by the user, including the photo 212A and the photo 212B. In this case, the page indicator 213 indicates a second page that is currently displayed by the terminal device 100 in the window 142. The second page is a page that displays all the highlight photos shot by the user and that is in the window 142.

A gallery application is used as an example. The terminal device 100 supports display of a shot photo and a shot video in the gallery application. Therefore, in this embodiment of this application, the terminal device 100 may display, in the gallery application, a target video that carries highlight photos (including the automatically generated highlight photos and the highlight photos shot by the user).

FIG. 3A-FIG. 3D show examples of user interfaces in which the terminal device 100 displays the target video and the highlight photos in the gallery application.

First, in the user interface shown in FIG. 1A, the terminal device 100 may detect a user operation performed on the gallery application icon 113C. In response to the operation, the terminal device 100 may display the user interface shown in FIG. 3A.

Figure 3A:
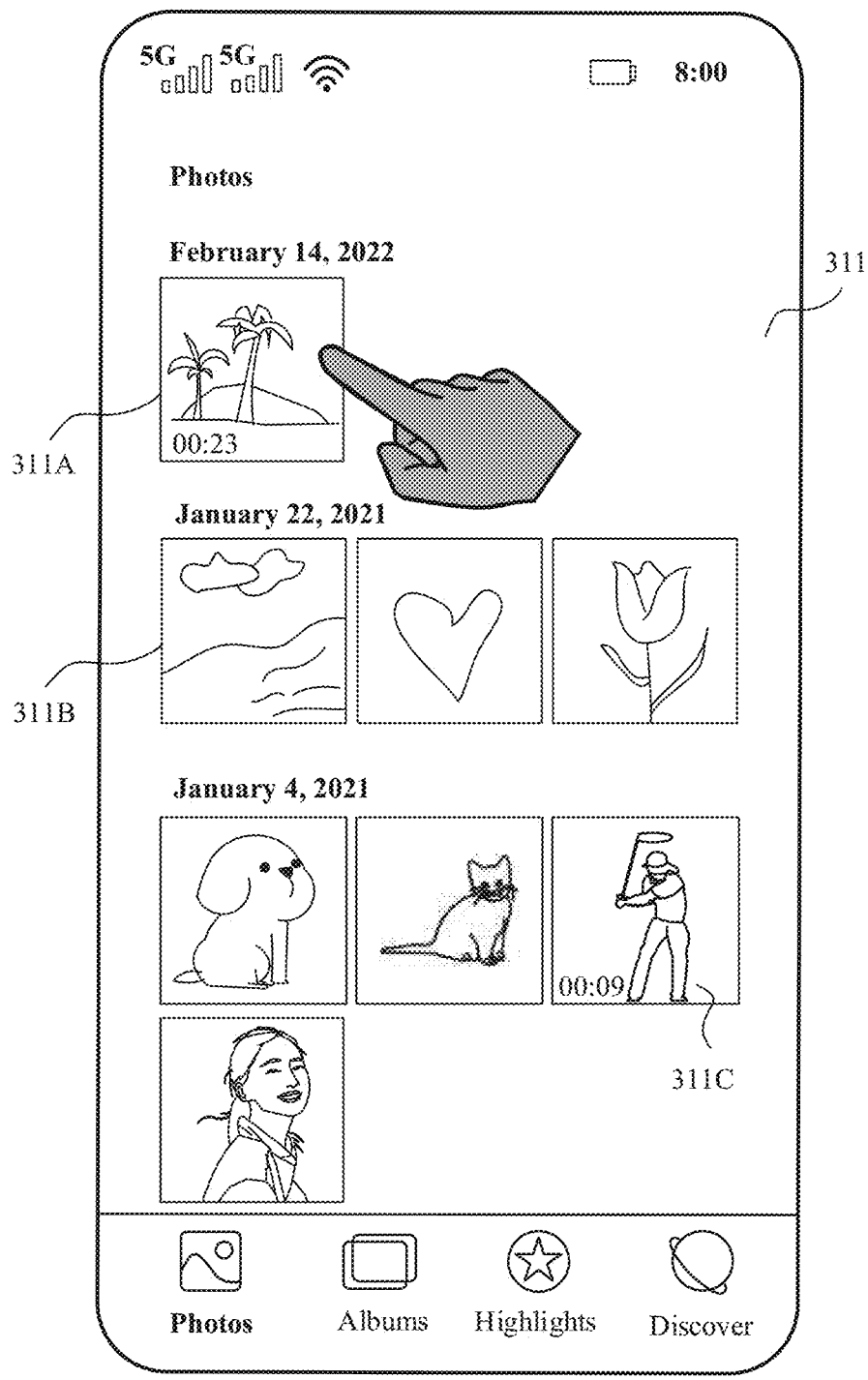
FIG. 3A-FIG. 3F are schematic diagrams of a group of user interfaces in a shooting process according to an embodiment of this application.

FIG. 3A shows an example of a user interface of the gallery application. The interface may include a window 311.

The window 311 may be used to display image resources stored in the terminal device 100, including photos and videos that are shot by the terminal device 100. For example, the terminal device 100 may sequentially display the photos and the videos based on a time for shooting each of the photos and the videos. As shown in FIG. 3A, the window 311 shows a plurality of image resources stored in the terminal devices 100, for example, a video 311A and a picture 311B. The video 311A may be the target video shot by the terminal device 100 in the "HIGHLIGHT CAPTURE" mode, namely, a video that carries highlight photos.

The terminal device 100 may detect a user operation performed on the video 311A, for example, an operation of tapping the video 311A. In response to the operation, the terminal device 100 may display the user interface shown in FIG. 3B.

Figure 3B:
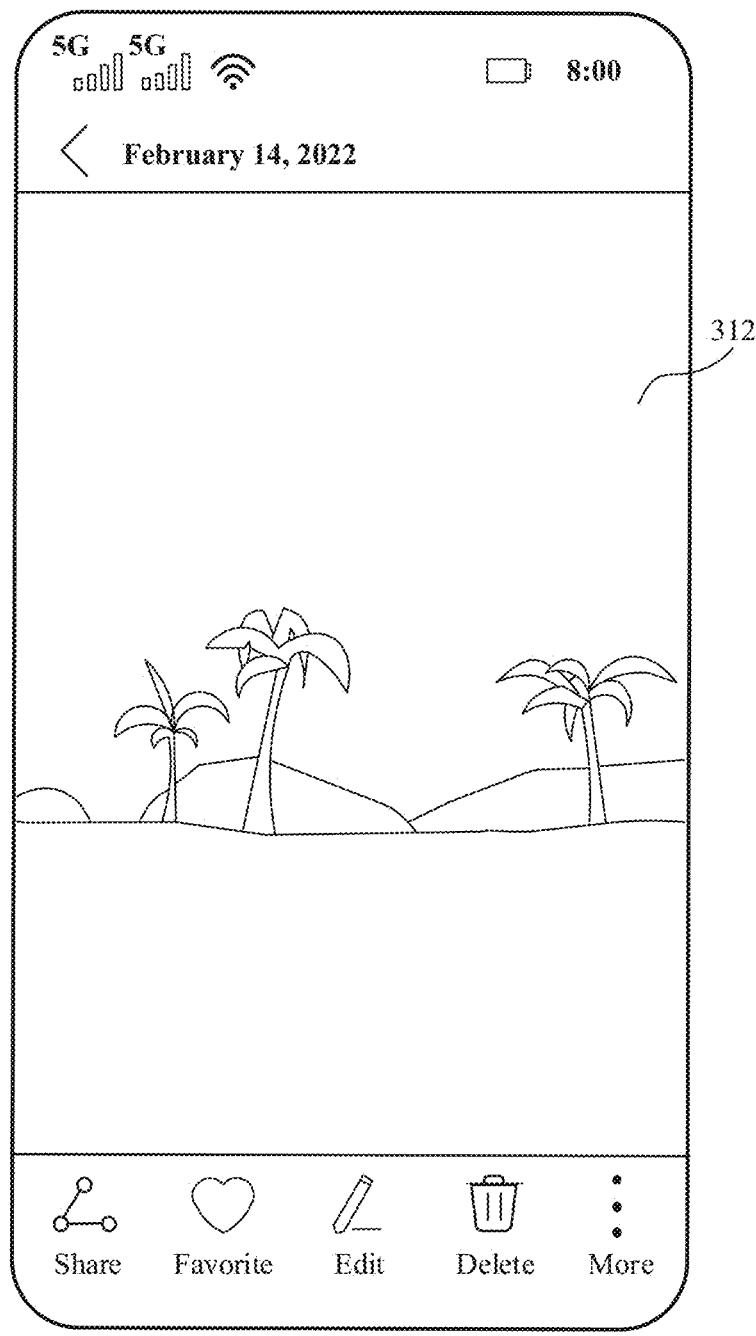
Figure 3C:
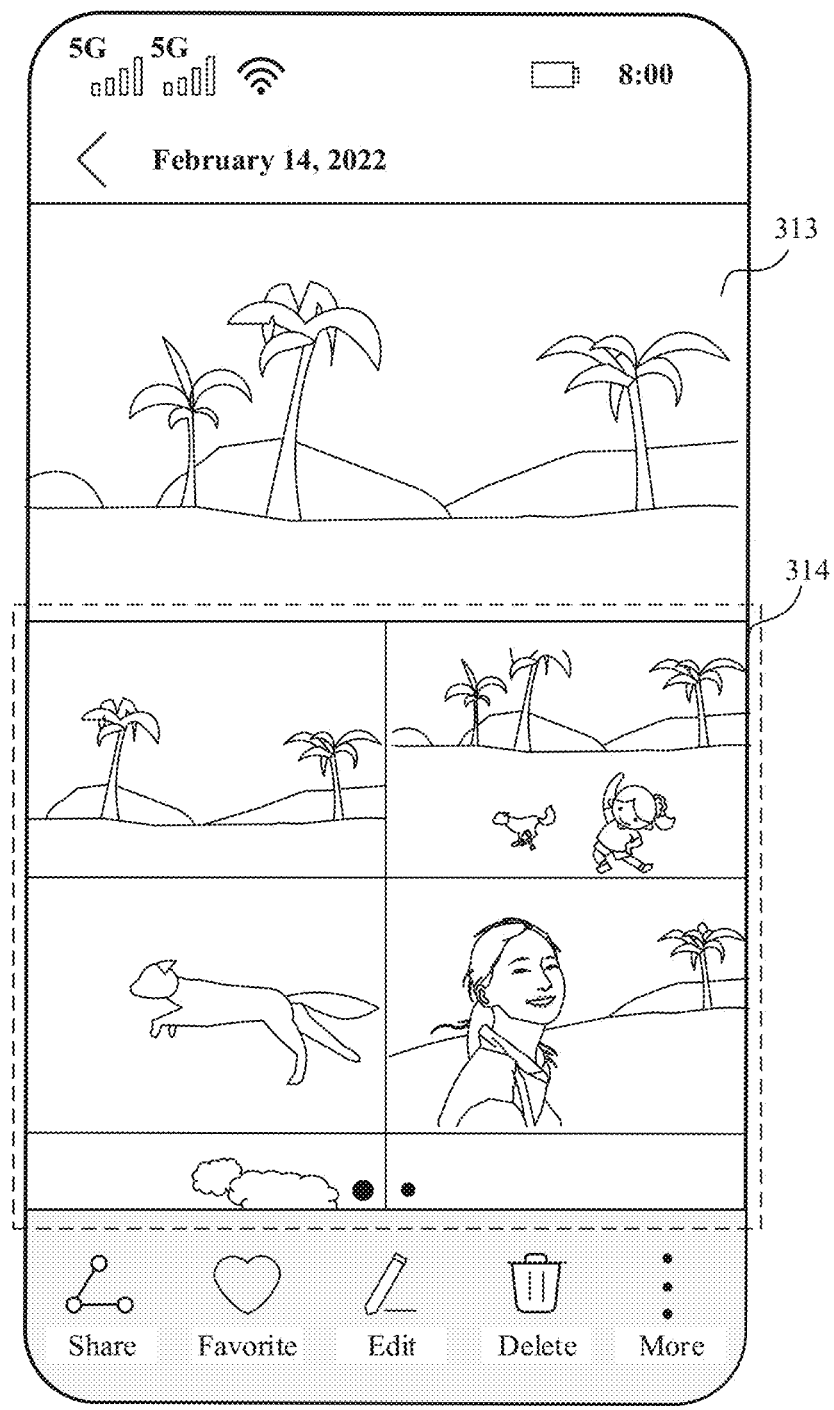

As shown in FIG. 3B, the user interface may include a window 312. The window 312 may be used to play the target video, namely, the video 311A. After the video 311A is played, the terminal device 100 may display the user interface shown in FIG. 3C. As shown in FIG. 3C, the interface may include a window 313 and a window 314. The window 313 may be used to play the target video. The window 314 may be used to display highlight pictures. For the window 313 and the window 314, refer to the detailed descriptions of the window 141 and the window 142 in FIG. 1G. Details are not described herein again.

Similarly, in the user interface shown in FIG. 3A, after detecting a user operation performed on the video 311A, the terminal device 100 may alternatively directly display the user interface shown in FIG. 3C.

In this way, the user can browse, by using the gallery application, the video recorded in the "HIGHLIGHT CAPTURE" mode. In addition, in a process of browsing the video, the user can view the highlight photos corresponding to the video, including the highlight photos automatically shot in the recording process and the highlight photos shot by the user by performing a shooting operation.

Figure 3D:
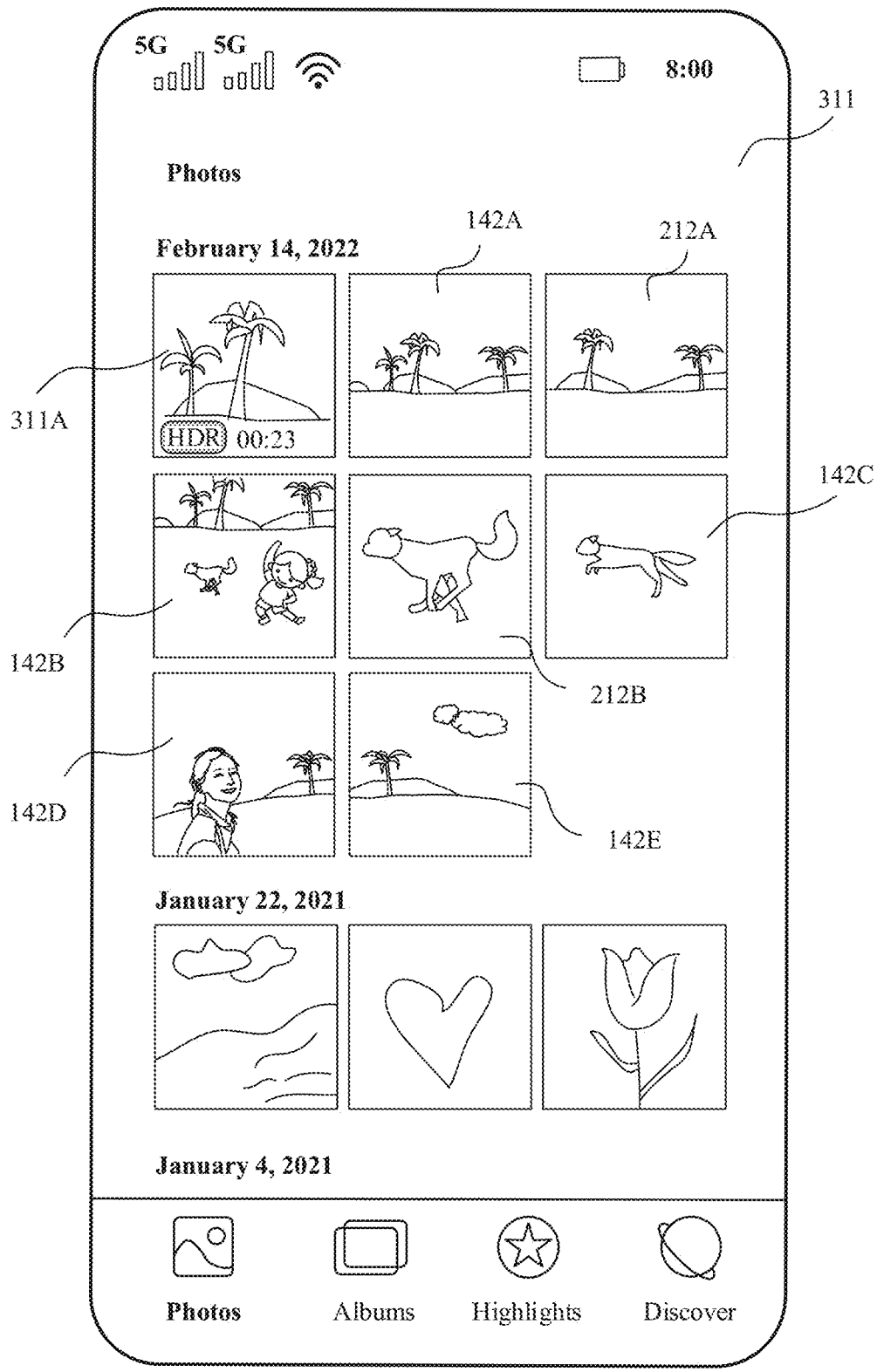

In some embodiments, with reference to the user interface shown in FIG. 3D, the terminal device 100 may alternatively simultaneously display the target video and the highlight photos corresponding to the target video. For example, the video 311A, and the highlight photo 142A~the photo 142E, the photo 212A, and the photo 212B that correspond to the video 311A may be displayed in the window 311.

In this way, the user can browse the highlight photos corresponding to the video 311A without tapping on the video 311A, thereby reducing user operations.

In some embodiments, the terminal device 100 may alternatively identify a magic moment in an obtained video, and generate a highlight photo. The obtained video may be a video previously shot by the terminal device 100 in the conventional "VIDEO" mode, or may be a local video saved by using a network.

Figure 3E:
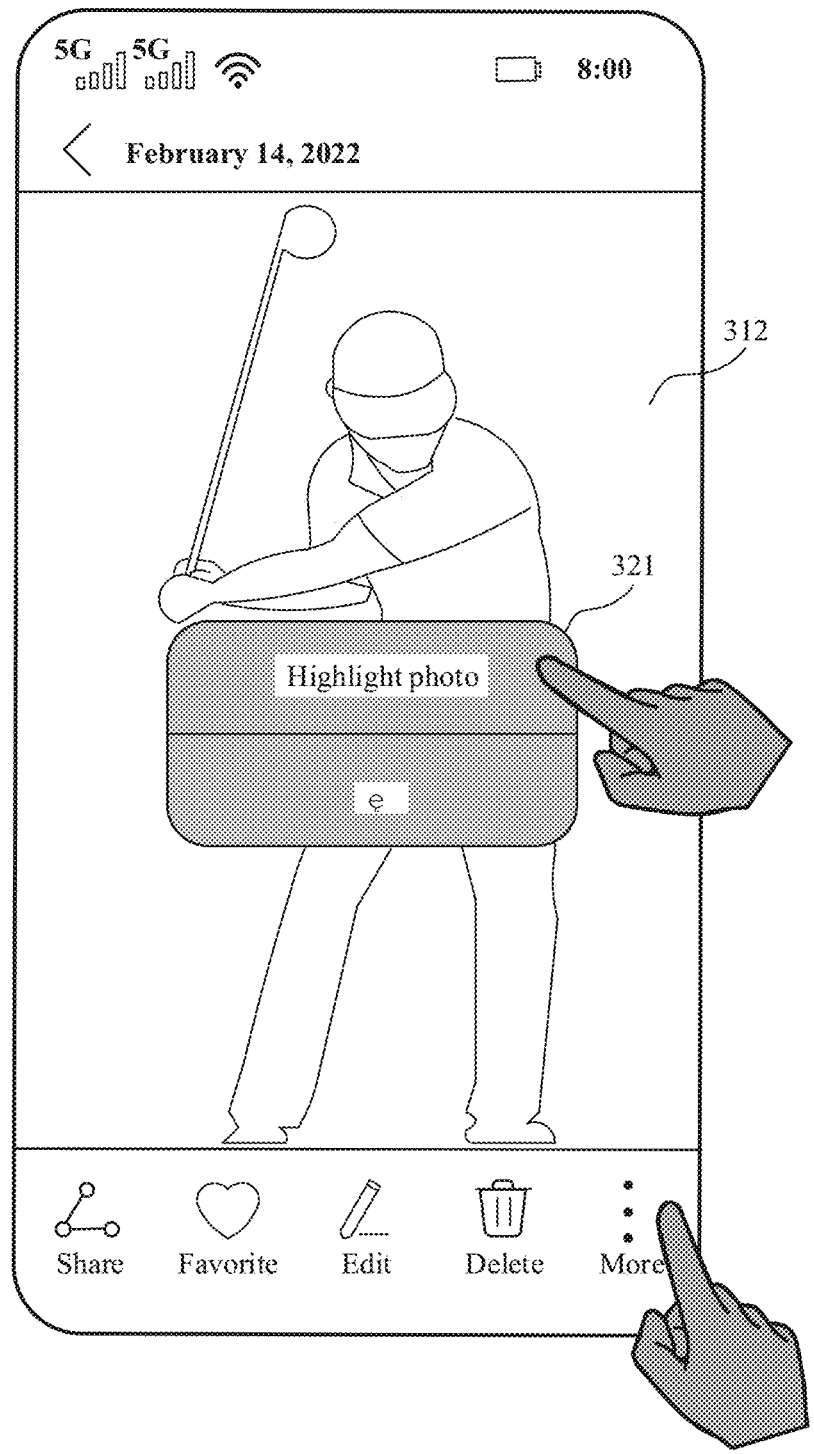

With reference to the user interface shown in FIG. 3A, a video 311C is further displayed in the interface. The video 311C is the foregoing obtained video. The terminal device 100 may detect a user operation performed on the video 311C. In response to the operation, the terminal device 100 may display the user interface shown in FIG. 3E. Then, the terminal device 100 may detect a user operation performed on a "MORE" button. The terminal device 100 may display a dialog box 321 in response to the operation.

Figure 3F:
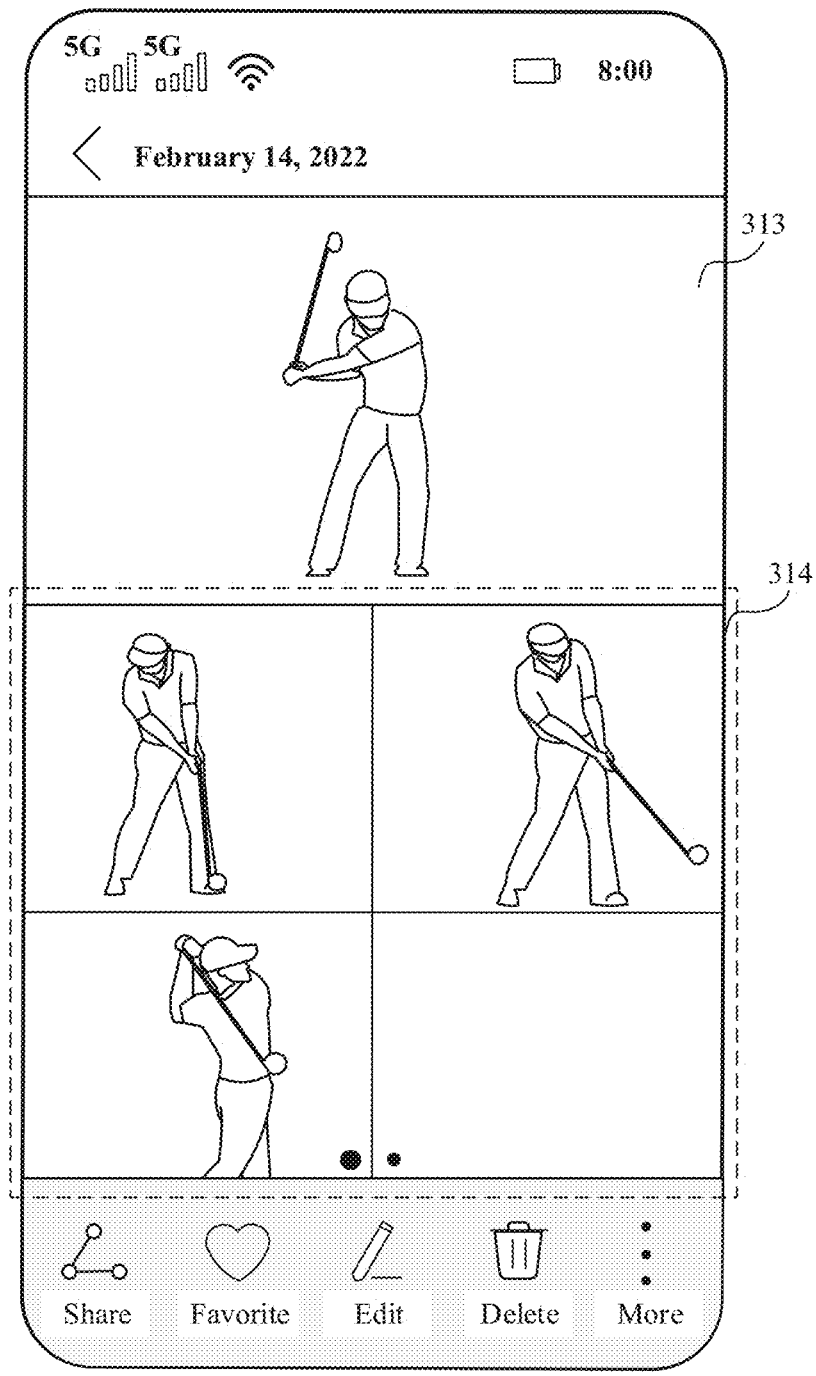

The dialog box 321 may include a "highlight photo" option. When detecting a user operation performed on the "highlight photo" option, the terminal device 100 may also identify magic moments in the video, and display highlight photos, with reference to the user interface shown in FIG. 3F. In this case, the video 311C may be displayed in the window 313. Highlight photos obtained from the video 311C may be displayed in the window 312.

Figure 4:
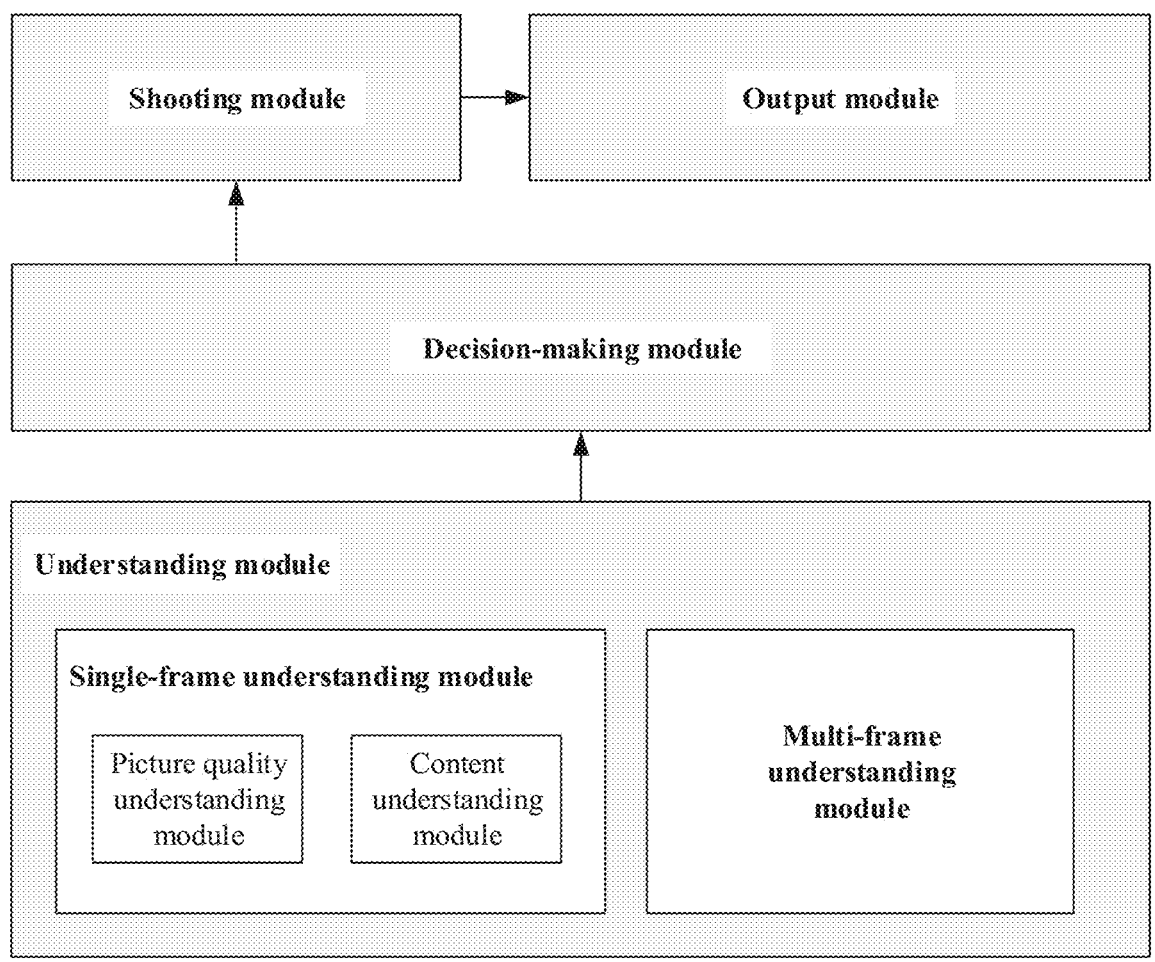
FIG. 4 is a diagram of a software structure of a shooting method according to an embodiment of this application.

FIG. 4 is a diagram of an example of a software structure of a shooting method according to an embodiment of this application.

As shown in FIG. 4, an understanding module, a decision-making module, a shooting module, and an output module may be disposed in the terminal device 100.

The understanding module may be configured to detect image quality, and identify image content and an action reflected by the image content. Specifically, the understanding module may include a single-frame understanding module and a multi-frame understanding module.

An object processed by the single-frame understanding module is a single image frame. The single-frame understanding module includes a picture quality understanding module and a content understanding module. The picture quality understanding module is configured to detect image quality of the single image frame. The image quality refers to image picture quality. Indicators used to evaluate the image picture quality include but are not limited to definition, noise, and a color. Therefore, detection of the image quality includes detection on image definition, whether there is noise, whether a color is distorted, and the like. The content understanding module is configured to identify image content of the single image frame. The image content includes but is not limited to a character and an animal, or may be a building, a waterfall, a wave, or the like.

An object processed by the multi-frame understanding module is a video stream, namely, a plurality of image frames. The multi-frame understanding module is configured to identify whether image content (for example, a character or an animal) in the video stream performs a specific preset action. The specific action is, for example, that a character is jumping up, an athlete is hurdling, a dog is running, a waterfall is falling and spreading, or a wave is surging. The terminal device 100 may identify the image content and the action based on prior learning and training of the terminal device 100.

After the understanding module detects the image quality and identifies the image content and the action reflected by the image content, the decision-making module may evaluate the image quality, the image content, and the action of the image frame. Based on the evaluation, the decision-making module may determine a highlight video frame in a processed stream, that is, determine a magic moment in a video recording process.

Specifically, the decision-making module may first separately evaluate the image quality, the image content, and the action reflected by the image content of the image frame. The decision-making module may evaluate and reflect, in a scoring manner, whether image quality of an image frame is excellent, and whether image content and an action reflected by the image content are highlight image content and a highlight action.

For example, the decision-making module may determine an image quality score of the image frame based on the image definition. The decision-making module may determine an image content score of the image frame based on an identification result of the image content (for example, whether the image content includes a character and whether the character smiles). Based on whether the specific action is identified, the decision-making module may evaluate a degree of completion of the action in each image frame constituting the action, and determine an action score of each image frame. A higher degree of completion of the action corresponds to a higher action score. For example, when the action is that a character jumps up, a moment at which the character jumps up to a highest point may be referred to as a moment at which the degree of completion of the action is the highest. Correspondingly, the degree of completion of the action of an image frame corresponding to the moment has an optimal evaluation.

After the image quality, the image content, and the action are separately scored, the decision-making module may determine a comprehensive score of the image frame based on the foregoing scores. When the comprehensive score is higher than a first threshold, the decision-making module may determine that the image frame is a highlight image frame.

Preferably, the decision-making module may dynamically adjust the first threshold based on a difference between image content included in image frames. For example, in a scenario in which the image content does not include a character or an animal, the decision-making module may determine a first threshold M1; in a scenario in which the image content includes a character or an animal but does not include a specific action, the decision-making module may determine a first threshold M2; and in a scenario in which the image content includes a character or an animal and includes a specific action, the decision-making module may determine a first threshold M0.

In this way, the terminal device 100 adjusts the first threshold based on different shooting scenarios, that is, adjusts a condition for determining whether a picture is a highlight picture, to help obtain a plurality of types of highlight photos. For example, when a user photographs a landscape, an image frame does not include a character or an animal, and does not include a specific action made by a character or an animal. Therefore, an image content score and an action score of the image frame are 0 or do not exist. If a first threshold, for example, M0, corresponding to an image frame that includes a character or an animal and a specific action is used, the image frame obtained by photographing the landscape is difficult to meet a requirement of the first threshold, and is difficult to be evaluated as a highlight photo. In this way, the user cannot obtain a highlight photo of a pure landscape type.

The shooting module may determine, from an original stream, an original highlight video frame corresponding to a highlight image frame determined by the decision-making module, to obtain a highlight photo. Then, the output module may display, to the user, the highlight photo obtained by the shooting module.

Figure 5:
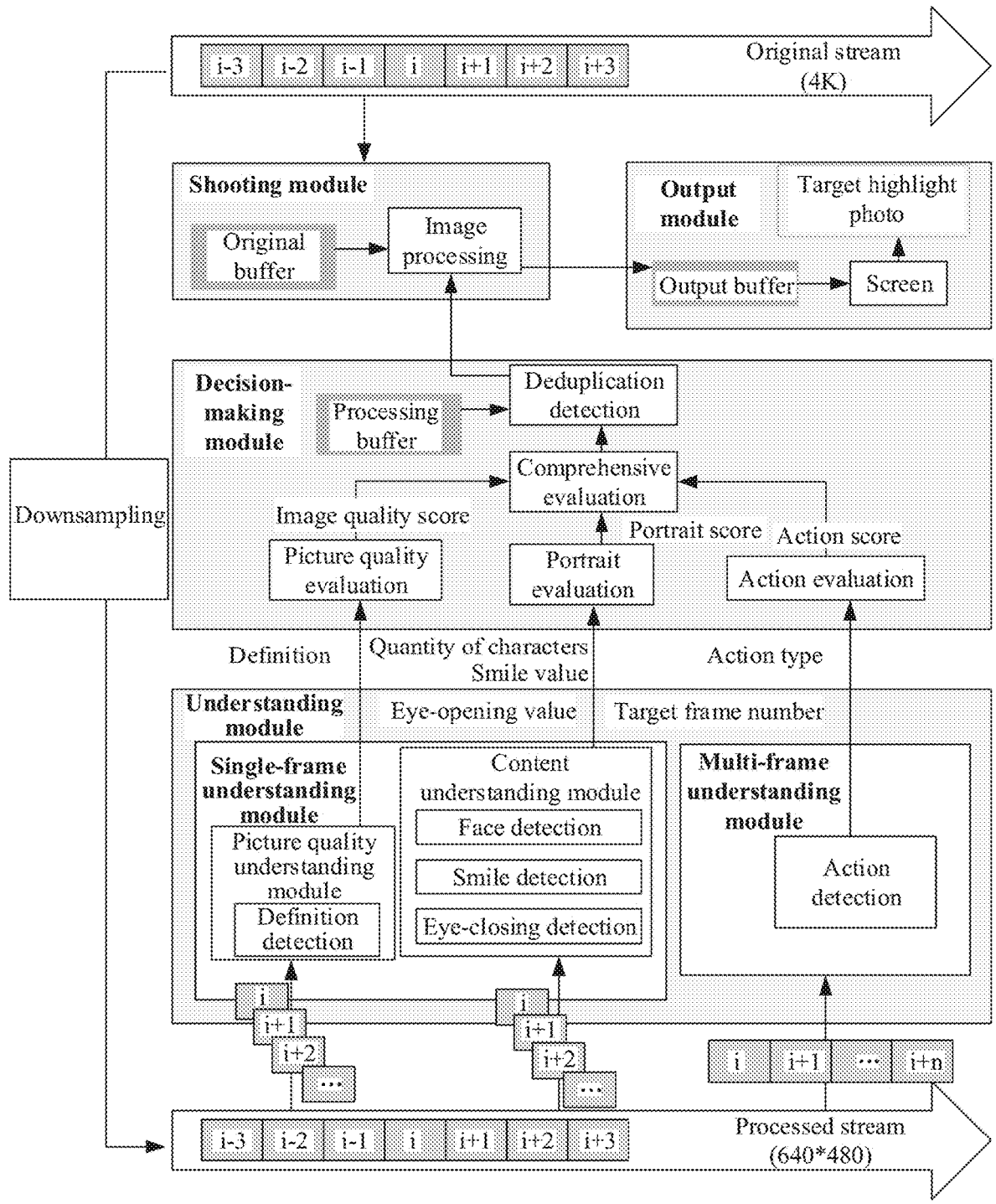
FIG. 5 is a flowchart of a shooting method according to an embodiment of this application.
Figure 6:
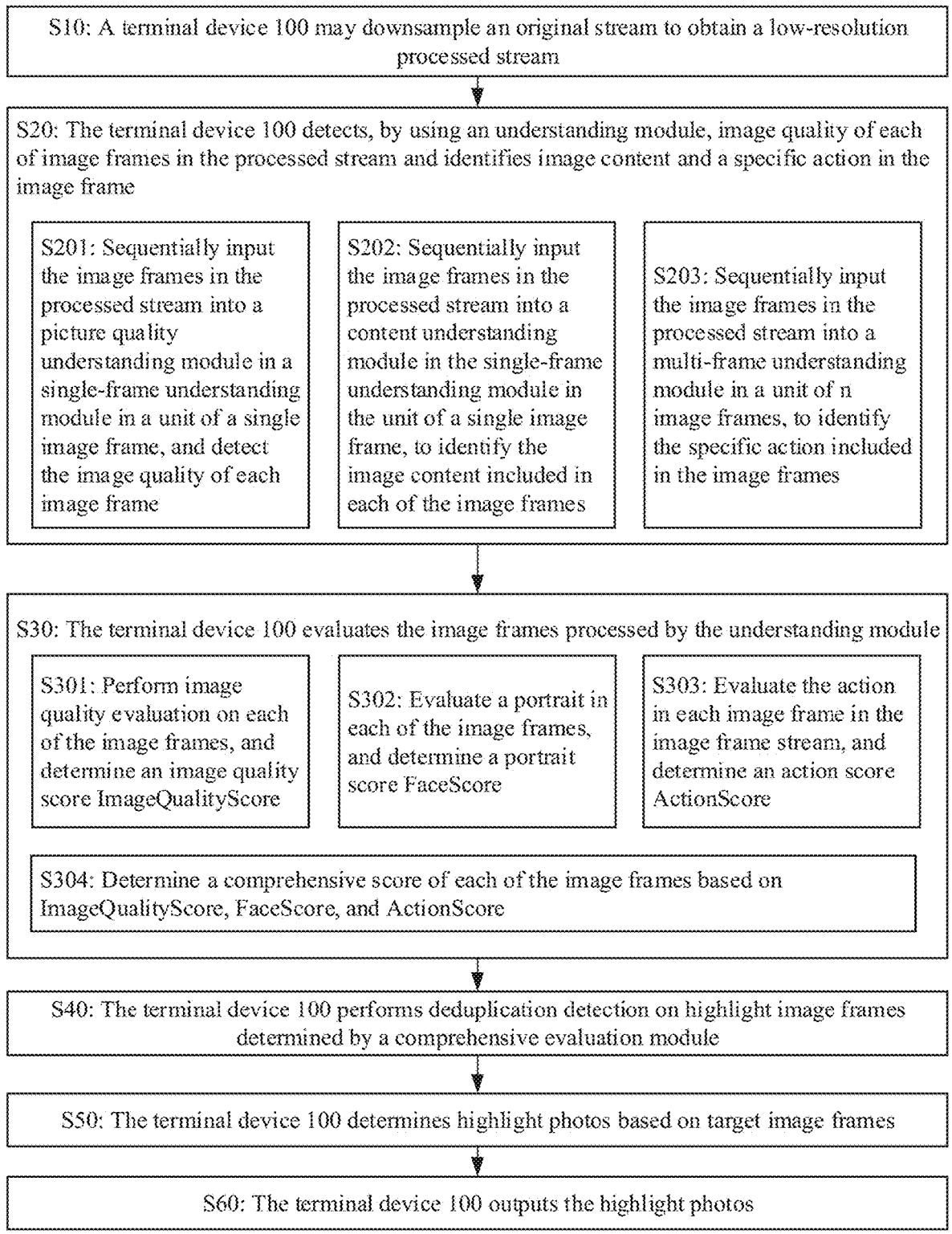
FIG. 6 is a flowchart of another shooting method according to an embodiment of this application.

Based on the diagram of the software structure shown in FIG. 4, FIG. 5 is a flowchart of an example in which the terminal device 100 performs video recording and highlight photo generation in the "HIGHLIGHT CAPTURE" mode. FIG. 6 is a flowchart of another example in which the terminal device 100 performs video recording and highlight photo generation in the "HIGHLIGHT CAPTURE" mode.

The following specifically describes, with reference to FIG. 5 and FIG. 6, a process in which the terminal device 100 implements the shooting method in this embodiment of this application to perform video recording and highlight photo generation.

S10: The terminal device 100 may downsample an original stream to obtain a low-resolution processed stream.

After a camera is enabled, the terminal device 100 may obtain, based on images collected by the camera in real time, an original stream constituted by the images collected in real time. Resolution of each image frame in the original stream is high, for example, is 4K. Therefore, a data volume of the image frames in the original stream is large, and is not suitable for an image analysis process that requires a large amount of image calculation.

Therefore, the terminal device 100 can downsample the original stream to obtain the low-resolution processed stream. For example, the terminal device 100 may downsample an original stream of 4K, to obtain a processed stream whose image resolution specification is 640*480. Compared with the original stream, a data volume of the processed stream is greatly reduced, and is more suitable for image quality detection and identification of image content and a specific action, thereby improving calculation efficiency and reducing calculation costs.

Usually, after shooting is completed, resolution of a video stored by the terminal device 100 is lower than that of an original image collected by the camera. For example, the original stream obtained by the camera through image collection may be 4K. However, a video stored after common shooting is 1080*1920. In other words, resolution of the stored video is lower than resolution of video frames in the original stream. Consequently, resolution of a highlight photo generated based on the shot video is low, which affects image definition.

In this embodiment of this application, although a highlight photo is generated in a video recording process, the highlight photo is not equivalent to a corresponding video frame in a video. In this case, the highlight photo is obtained based on a high-resolution image collected by the camera, and the video is obtained by compressing high-resolution images collected by the camera. Therefore, in this embodiment of this application, the resolution of the highlight photo finally obtained by the terminal device 100 is higher than that of the video in most cases.

S20: The terminal device 100 detects, by using the understanding module, image quality of each of image frames in the processed stream and identifies image content and a specific action in the image frame.

FIG. 5 shows examples of seven continuous image frames included in the original stream, which are respectively denoted as an image frame i−3, an image frame i−2, an image frame i−1, an image frame i, an image frame i+1, an image frame i+2, and an image frame i+3. Correspondingly, the processed stream may also include the seven image frames. A difference between the image frame i−3~the image frame i+3 in the original stream and the image frame i−3~the image frame i+3 in the processed stream lies in resolution.

Preferably, the seven image frames may alternatively be a group of continuous image frames obtained from the original stream through frame extraction in a frame extraction manner. A frame extraction interval is fixed, for example, three frames.

In one aspect, the terminal device 100 may sequentially input the image frames in the processed stream into the single-frame understanding module in a unit of a single image frame, then detect image quality of each of the image frames by using a preset algorithm in the single-frame understanding module, and identify image content in the image frame. In another aspect, the terminal device 100 may sequentially input the image frames in the processed stream into the multi-frame understanding module in a unit of n image frames, and then identify a specific action in the image frame stream by using a preset algorithm in the multi-frame understanding module, where n is a positive integer greater than 1. For example, n=5.

S201: Sequentially input the image frames in the processed stream into the picture quality understanding module in the single-frame understanding module in a unit of a single image frame, and detect the image quality of each image frame.

The picture quality understanding module may detect image quality of the image frame i based on a preset picture quality detection algorithm.

In this embodiment of this application, the picture quality detection algorithm may be a definition detection algorithm. The picture quality detection algorithm may alternatively include another detection algorithm, for example, a noise detection algorithm or a color detection algorithm. This is not limited in this embodiment of this application.

First, the picture quality understanding module may determine definition of a detected image frame by using the definition detection algorithm. Then, the picture quality understanding module may compare the definition of the detected image frame with a definition threshold. When the definition of the detected image frame is lower than the definition threshold, the picture quality understanding module may determine that the detected image frame is an unclear image frame. Otherwise, the picture quality understanding module may determine that the detected image frame is a clear image frame. In addition, the picture quality understanding module may output the definition of the image frame and denote the definition as Def.

The image frame i in the processed stream is used as an example. After the image frame i is input into the picture quality understanding module, the picture quality understanding module may use the definition detection algorithm to determine definition of the image frame i, and denote the definition as Def_i. Then, the picture quality understanding module may compare Def_i with the definition threshold (denoted as Def_threshold). If Def_i<Def_threshold, the picture quality understanding module may determine that the image frame i is an unclear image frame. Otherwise, the picture quality understanding module may determine that the image frame i is a clear image frame.

Optionally, the definition detection algorithm may be a classic image processing method, for example, a structure similarity index measure (Structure Similarity Index Measure, SSIM). Usually, if the detected image frame (for example, the image frame i) is a clear image frame, similarity between the image frame i and an image frame i obtained after blurring processing is low. Otherwise, if the image frame i is a blurry image frame, similarity between the image frame i and an image frame i obtained after blurring processing is high. Therefore, the picture quality understanding module may determine, by using the SSIM, the similarity between the image frame i and the image frame i obtained after blurring processing, and denote the similarity as Sim_i. In this case, the definition Def_i of the image frame i may be represented as 1−Sim_i. Lower similarity indicates higher definition of the image frame i. Therefore, the picture quality understanding module may determine that the detected image frame is a clear image.

Optionally, the definition detection algorithm may alternatively be a deep learning algorithm, for example, a convolutional neural network (Convolutional Neural Networks, CNN) algorithm, a learning from rankings for no-reference image quality (Learning from Rankings for No-Reference Image Quality, RankIQA) algorithm, or the like. The picture quality understanding module may first establish a definition detection model based on the deep learning algorithm, determine a feature vector of a clear image, and then input the image frame i into the model to determine whether the image frame i is a clear image.

S202: Sequentially input the image frames in the processed stream into the content understanding module in the single-frame understanding module in the unit of a single image frame, to identify the image content included in each of the image frames.

When the picture quality understanding module detects image quality of a single image frame, the content understanding module may identify image content in the image frame based on a preset image content identification algorithm.

In this embodiment of this application, the image content identified based on the image content identification algorithm includes a character. Further, the image content identification algorithm is further used to identify whether the character smiles and closes eyes. Specifically, the content understanding module may include a face detection algorithm, a smile detection algorithm, and an eye-opening detection algorithm. The face detection algorithm may be used to identify whether an image frame includes a character. The smile detection algorithm may be used to identify whether the character in an image frame is smiling. The eye-opening detection algorithm may be used to identify whether eyes of a character in an image frame are closed. The face detection algorithm, the smile detection algorithm, and the eye-opening detection algorithm may be implemented by using a deep learning algorithm, for example, the CNN algorithm. Details are not described herein again.

In another embodiment, image content identified based on the content identification algorithm may further include an animal, for example, a dog or a cat. This is not limited in this embodiment of this application.

Similarly, the image frame i in the processed stream is used as an example. The content understanding module may also receive the image frame i. First, the content understanding module may identify, by using the face detection algorithm, whether the image frame i includes a character, output a quantity of characters that are identified, and denote the quantity of identified characters as NumOfPeople. A value of NumOfPeople is a positive integer. NumOfPeople=0) may indicate that no character is identified. NumOfPeople=x may indicate that x characters are identified, where x is a non-zero positive integer.

After a character is identified, the content understanding module may use the smile detection algorithm to identify whether each character in one or more characters in the image frame i smiles, output a smile value of each character, and denote the smile value as SmileScore. SmileScore may be used to reflect whether and to what extent a character in an image smiles. SmileScore=0 may indicate that the character does not smile. SmileScore>0) may indicate that the character smiles, and a larger value of SmileScore indicates a brighter smile of the character.

In addition, after a character is identified, the content understanding module may further use the eye-opening detection algorithm to identify whether eyes of each character in the one or more characters in the image frame i are opened, output an eye-opening value of each character, and denote the eye-opening value as OpenEyeScore. OpenEyeScore=0 may indicate that the eyes of the character are closed. OpenEyeScore>0 may indicate that the eyes of the character are opened.

Figure 7:
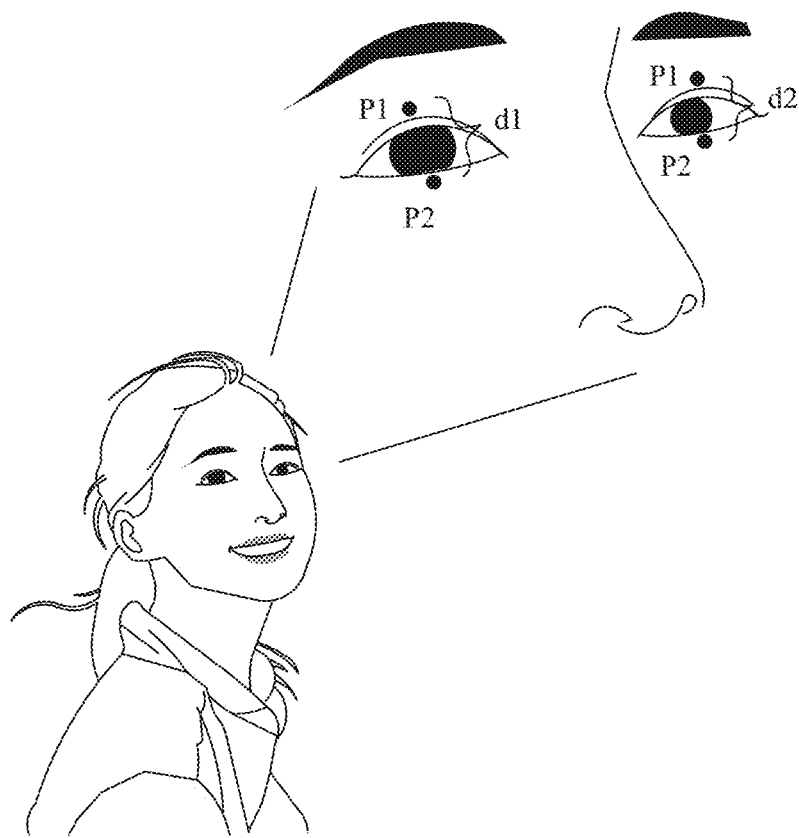
FIG. 7 is a schematic diagram of an ocular region of a face according to an embodiment of this application.

Specifically, during identification on whether the eyes of the character in the image frame i are opened, the content understanding module may first use a neural network, for example, a CNN, to identify key points on a face. The key points include upper eyelid median points P1 and lower eyelid median points P2. FIG. 7 shows examples of a group of upper eyelid median points P1 and a group of lower eyelid median points P2 on a face. Therefore, the content understanding module may determine two eyelid distances based on the group of P1 and the group of P2, and respectively denote the two eyelid distances as d1 and d2. An eye-opening threshold is recorded in the eye-opening detection algorithm, and is denoted as OpenEye_threshold. When the eyelid distance is greater than OpenEye_threshold, it may be considered that the eyes of the character are opened. Further, if both eyelid distances of left and right eyes on a face are greater than Open Eye_threshold, it may be considered that the eyes on the face are opened. Optionally, if at least one of eyelid distances of left and right eyes on a face is greater than OpenEye_threshold, it may be considered that the eyes on the face are opened.

S203: Sequentially input the image frames in the processed stream into the multi-frame understanding module in a unit of n image frames, to identify a specific action included in the image frames.

The multi-frame understanding module may include an action detection algorithm. Whether a preset action is included in the n image frames may be identified based on the action detection algorithm by using the n input image frames.

The action includes but is not limited to jumping, hurdling, running, spinning, or football shooting. When the image content is a character, the action may be an action performed by the character, for example, jumping, hurdling, running, spinning, or football shooting. When the image content includes an animal, the action may be an action performed by the animal, for example, jumping, hurdling, running, or spinning. Image content in one image frame may include both a character and an animal.

Specifically, the multi-frame understanding module may train a deep neural network by using an annotated video sequence. Then, the multi-frame understanding module may identify, by using the deep neural network, whether the n input image frames include the preset action and an action type, output the action type (ActionType) and a frame number corresponding to an image frame covered by the action, and denote the frame number as a target frame number (FrameNumber).

For example, the deep neural network may learn a large quantity of videos annotated with running actions, and further determine image features of the videos with the running actions, for example, a character in an image, a pose of the character, and a change process of the pose in continuous video frames. For example, for any input video, the deep neural network may extract an image feature in the video to determine whether the image feature matches the running action, for example, determine whether the video includes a character, a pose of the character, and whether a change of the pose matches a preset running action.

It is assumed that n=10, and a character runs in the second frame~the seventh frame. The multi-frame understanding module may identify, by using the deep neural network obtained through training (including the image features of the running actions), that the change of the pose of the character in the second image frame~the seventh image frame in the 10 image frames meets an image feature of the preset running action. Therefore, the multi-frame understanding module may determine that the second image frame~the seventh image frame include a running action, and the multi-frame understanding module may determine that target frame numbers of image frames including the running action are 2~7.

S30: The terminal device 100 evaluates the image frames processed by the understanding module.

As shown in FIG. 5, the decision-making module may include a picture quality evaluation module, a portrait evaluation module, an action evaluation module, and a comprehensive evaluation module.

The picture quality evaluation module may score the image quality of each of the image frames based on a definition detection result to obtain an image quality score, and denote the image quality score as ImageQualityScore. The portrait evaluation module may score a portrait based on results of face detection, smile detection, and eye-opening detection to obtain a portrait score, and denote the portrait score as FaceScore. The action evaluation module may score each image frame in the detected image frame stream based on an action detection result to obtain an action score of each image frame, and denote the action score as ActionScore.

The comprehensive evaluation module may determine a comprehensive score of each image frame based on score results of the picture quality evaluation module, the portrait evaluation module, and the action evaluation module. The comprehensive evaluation module may determine, based on the comprehensive score, whether the image frame is a highlight image frame.

S301: Perform image quality evaluation on each of the image frames, and determine an image quality score ImageQualityScore.

The picture quality evaluation module may determine, based on the definition that is of each of the image frames and that is output by the picture quality understanding module, ImageQualityScore of the image frame.

In some embodiments, a formula used by the picture quality evaluation module to determine ImageQualityScore of the image frame is:

$$\text{ImageQualityScore} = \text{Def}\_i$$

For example, it is assumed that the definition that is of the image frame i and that is output by the picture quality understanding module is Def_i=0.8, then the picture quality evaluation module may determine ImageQualityScore of the image frame i as follows:

$$\text{ImageQualityScore} = \text{Def}\_i = 0.8$$

It is assumed that the definition threshold Def_threshold=0.7, then the picture quality evaluation module may determine that the image frame i is a clear image.

With reference to the descriptions of S201, when the definition of the image is detected by using the CNN or RankIQA algorithm, a result output based on the CNN or RankIQA algorithm is the definition Def_i of the image frame i. When the definition of the image is detected by using the SSIM algorithm, a result output based on the SSIM algorithm is the similarity Sim_i between the image frame i and the image frame i obtained after blurring processing. In this case, the definition Def_i of the image frame i may be represented as 1−Sim_i, that is, Def_i=1−Sim_i.

For example, it is assumed that the similarity that is output based on the SSIM algorithm and that is between the image frame i and the image frame i obtained after blurring processing is Sim_i=0.2, then the picture quality evaluation module may determine ImageQuality Score of the image frame i as follows:

ImageQuality Score=1−Sim_i=0.8

In some embodiments, a calculation formula of ImageQualityScore may alternatively be shown as follows:

ImageQualityScore=Def_i*k1

The coefficient k1 is a weight occupied by picture quality evaluation in comprehensive evaluation. In this way, when performing comprehensive scoring on each of the image frames, the comprehensive evaluation module may not need to perform data standardization processing.

S302: Evaluate a portrait in each of the image frames, and determine a portrait score FaceScore.

With reference to the descriptions of S202, the content understanding module may determine the quantity of characters NumOfPeople, the smile value SmileScore, and the eye-opening value OpenEyeScore in each of the image frames based on the face detection algorithm, the smile detection algorithm, and the eye-opening detection algorithm. The portrait evaluation module may determine FaceScore of the image frame based on NumOfPeople, SmileScore, and OpenEyeScore.

In some embodiments, a formula used by the portrait evaluation module to determine FaceScore of the image frame is:

$$FaceScore = \begin{cases} SmileScore * OpenEyeScore, & \text{If } NumOfPeople \geq 1 \\ 0, & \text{If } NumOfPeople = 0 \end{cases}, \text{where:}$$

$$OpenEyeScore = \begin{cases} OpenEyeScore, & \text{If } OpenEyeScore \geq OpenEye\_threshold \\ 0, & \text{If } OpenEyeScore < OpenEye\_threshold \end{cases}$$

When OpenEyeScore<OpenEye_threshold, the portrait evaluation module may determine that eyes of a character in the image frame are closed. In this case, the portrait evaluation module may set OpenEyeScore of the image frame to 0. In this way, FaceScore of the image frame is also 0. This means that, although the task in the image frame smiles brightly, the decision-making module can still determine that the image frame is not a highlight image frame because the eyes of the character in the image are closed.

When a plurality of faces are detected in the image frame, the portrait evaluation module may obtain a plurality of groups of SmileScore and OpenEyeScore. In this case, FaceScore of the image frame may be represented as:

$$FaceScore = \begin{cases} \sum \frac{1}{NumOfPeople} * SmileScore * OpenEyeScore, & \text{if } NumOfPeople \geq 1 \\ 0, & \text{if } NumOfPeople = 0 \end{cases}$$

With reference to S301, when determining FaceScore, the portrait evaluation module may also carry a weight k2 occupied by portrait evaluation in the comprehensive evaluation. Therefore, after determining FaceScore, the portrait evaluation module further needs to perform:

FaceScore=FaceScore*k2

In some embodiments, a formula used by the portrait evaluation module to determine FaceScore of the image frame may alternatively be:

$$FaceScore = \begin{cases} SmileScore * OpenEyeScore, & \text{If } NumOfPeople \geq 1 \\ 0, & \text{If } NumOfPeople = 0 \end{cases}$$

Similarly, $$OpenEyeScore = \begin{cases} OpenEyeScore, & \text{If } OpenEyeScore \geq OpenEye\_threshold \\ 0, & \text{If } OpenEyeScore < OpenEye\_threshold \end{cases}$$

In this case, when the eyes of the character in the image frame are closed, that is, when OpenEyeScore=0, the portrait evaluation module does not determine that FaceScore=0 in the image frame. In this way, eye-closing behavior does not directly negate a simultaneous smile, that is, a moment at which the character smiles with eyes closed is also a magic moment.

Correspondingly, when the plurality of faces are detected in the image frame, FaceScore of the image frame may be represented as:

$$FaceScore = \begin{cases} \sum \frac{1}{NumOfPeople}(SmileScore + OpenEyeScore), & \text{if } NumOfPeople \geq 1 \\ 0, & \text{if } NumOfPeople = 0 \end{cases}$$

S303: Evaluate an action in each image frame in the image frame stream, and determine an action score ActionScore.

With reference to the descriptions of S202, the multi-frame understanding module may output and identify whether the n input image frames include the preset action and the action type, and output the action type (ActionType) and the target frame number (FrameNumber). The action evaluation module may score each image frame in the n image frames based on ActionType and FrameNumber. and determine ActionScore of each image frame.

Specifically, the action evaluation module may determine, based on FrameNumber, a frame number of an image frame that does not include an action and that is in the n input image frames. In this case, for the image frame that does not include an action and that is in the n image frames, the action evaluation model may directly determine that ActionScore=0 for the image frame.

For image frames that include an action and that are in the n image frames, the action evaluation model may determine ActionScore of each image frame based on a standard pose template.

Specifically, the action evaluation module may determine the standard pose template of the action based on ActionType. One preset action corresponds to a standard pose template of the action. The standard pose template indicates a pose presented when a degree of completion of one action is the highest in a process of performing the action.

For example, when a character performs an action of jumping up, a moment at which the character jumps up to a location at a highest point may be considered as a moment at which a degree of completion of the jump action is the highest. In this case, a jump pose corresponding to the location at the highest point may be used as a standard pose template. Then, the action evaluation module may determine, based on the standard pose template, an image frame whose degree of completion of the jump action is the highest in the n image frames, namely, an image frame most similar to the standard pose template. For example, with reference to different image content shown in FIG. 4, the standard pose template may alternatively be an image in which a wave surges to a highest point, or the like.

First, the action evaluation model may determine, based on a bone point identification algorithm, bone points of the image frame including the action. Then, the action evaluation model may calculate similarity between the bone points in the image frame and bone points in the standard pose template. Higher similarity indicates that an action pose in the image frame is more similar to that in the standard pose template, namely, a higher degree of completion of the action in the image frame. Otherwise, the degree of completion of the action in the image frame is lower.

Then, the action evaluation module may determine, based on the similarity. ActionScore of each image frame in the image frames that include the action. A higher degree of completion of the action in the image frame correspondingly indicates higher ActionScore of the image frame. Otherwise, ActionScore of the image frame is lower.

With reference to S301, when determining ActionScore, the portrait evaluation module may also carry a weight k3 occupied by action evaluation in the comprehensive evaluation. Therefore, after determining ActionScore, the action evaluation module further needs to perform:

ActionScore=ActionScore*$k3$

S304: Determine a comprehensive score of each of the image frames based on ImageQualityScore, FaceScore, and ActionScore.

In some embodiments, a calculation process of the comprehensive score (TotalScore) of each of the image frames may be shown as follows:

TotalScore=$k1$*ImageQualityScore+$k2$*FaceScore+$k3$*ActionScore k1, k2, and k3 are weight coefficients occupied by ImageQualityScore. FaceScore, and ActionScore in the comprehensive score. Preferably, a value range of each of ImageQualityScore, FaceScore, and ActionScore is 0~1, and k1=k2=k3=⅓.

Then, the comprehensive score module may compare TotalScore of the image frame with the first threshold M0. If TotalScore>M0, the comprehensive evaluation module may determine that the image frame is a highlight image frame. Otherwise, the comprehensive evaluation module may determine that the image frame is not a highlight image frame. For example, M0=0.8.

Preferably, in some embodiments, the comprehensive score module may determine, based on different first thresholds, whether image frames of different types are highlight image frames.

1. The image frame is an image frame that does not include the preset image content and the preset action, that is, FaceScore=0 and ActionScore=0.

In this case, the comprehensive score of the image frame is:

TotalScore=$k1$*ImageQualityScore

In this case, the comprehensive evaluation module may use the first threshold M1, where M1<M0, for example, M1=0.25.

2. The image frame is an image frame that includes the preset image content but does not include the preset action, that is, FaceScore≠0 and ActionScore=0.

In this case, the comprehensive score of the image frame is:

$$TotalScore = k1 * ImageQualityScore + k2 * FaceScore$$

In this case, the comprehensive evaluation module may use the first threshold M2, where M1<M2<M0, for example, M2=0.55.

3. The image frame is an image frame that includes the preset image content and the preset action, that is, FaceScore≠0 and ActionScore≠0.

In this case, the comprehensive score of the image frame is:

TotalScore=$k1$*ImageQualityScore+$k2$*FaceScore+$k3$*ActionScore

In this case, the comprehensive evaluation module may use the first threshold M0.

With reference to the descriptions of S301, S302, and S303, if the picture quality evaluation module carries k1 when determining ImageQualityScore, the portrait evaluation module carries k2 when determining FaceScore, and the action evaluation module carries k3 when determining ActionScore, the comprehensive evaluation may no longer carry the foregoing weight coefficients as follows:

TotalScore=ImageQualityScore+FaceScore+ActionScore

S40: The terminal device 100 performs deduplication detection on highlight image frames determined by the comprehensive evaluation module.

In some embodiments, after the comprehensive evaluation module determines that one image frame is a highlight image frame, the shooting module may determine, based on a number of the image frame, a high-resolution image frame that is in the original stream and that corresponds to the image frame, and perform image processing corresponding to a shooting action, to obtain a highlight photo.

In some other embodiments, the terminal device 100 avoids outputting images with high similarity even if all the images are highlight images, to control a quantity of output highlight photos. Therefore, the decision-making module may further include a deduplication detection module. The deduplication detection module may perform similarity detection on the highlight image frames determined by the comprehensive evaluation module. For a group of similar highlight image frames, the deduplication detection module may determine that one frame with a highest comprehensive score in the group of highlight image frames is a target image frame.

Figure 8:
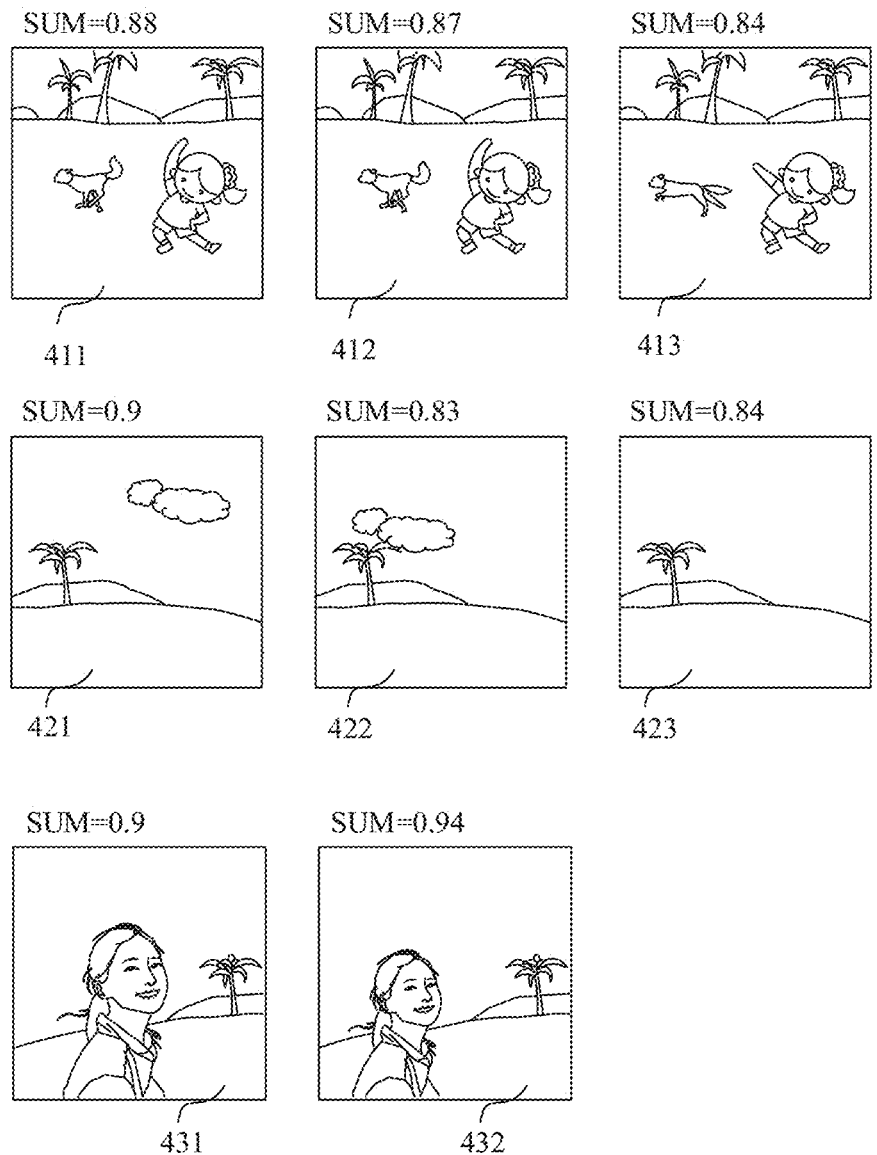
FIG. 8 is a schematic diagram of a plurality of highlight image frames that are in a video and that are selected by a terminal device according to an embodiment of this application.

FIG. 8 shows examples of a plurality of highlight image frames. The plurality of highlight image frames are respectively denoted as highlight image frames 411~413, 421~423, and 431~432.

Specifically, the decision-making module may include a processing buffer. The processing buffer is a piece of storage space. The processing buffer may be configured to buffer the highlight image frames. The image frames that are determined as the highlight image frames by the comprehensive evaluation module may be sequentially stored in the processing buffer. For example, the plurality of highlight image frames shown in FIG. 8 are sequentially stored in the processing buffer.

The deduplication detection module may use a similarity algorithm to calculate similarity between the highlight image frames stored in the processing buffer. The deduplication detection module may obtain a group of similar highlight image frames based on the similarity. For the group of similar highlight image frames, the deduplication detection module may mark an image frame with a highest comprehensive score in the group of highlight image frames as a target image frame.

For example, the deduplication detection module may determine, by using the similarity algorithm, that image frames similar to the highlight image frame 411 include, highlight image frames 412 and 413. In this case, the deduplication detection module may select one frame with highest TotalScore from the highlight image frames 411~413 as a target image frame. For example, it is assumed that TotalScore of the highlight image frames 411~413 are respectively 0.88, 0.87, and 0.84. Then, the deduplication detection module may determine that the highlight image frame 411 is the target image frame.

Then, the deduplication detection module may continue to determine that image frames similar to the highlight image frame 421 are the highlight image frames 422 and 423, and determine that the highlight image frame 421 is a target image frame. Then, the deduplication detection module determines that an image frame similar to the highlight image frame 431 is the highlight image frame 432, and determines that the highlight image frame 432 is a target image frame.

The deduplication detection module may alternatively directly obtain a plurality of groups of similar highlight image frames based on a clustering algorithm, and then determine an image frame with highest TotalScore in each group of highlight image frames as a target image frame.

S50: The terminal device 100 determines highlight photos based on target image frames.

The shooting module may include an original buffer. The original buffer may be configured to buffer the original stream.

In some embodiments, after receiving indication information that is of the target image frames and that is output by the deduplication detection module, for example, frame numbers of the target image frames, the shooting module may determine, based on the indication information, image frames that are in the original stream and that correspond to the target image frames in the processed stream, and denote the image frames as original target image frames. Then, the shooting module may obtain the highlight photos based on the original target image frames.

Optionally, the shooting module may further include an image processing module. The image processing module may be configured to perform image fusion processing on a plurality of image frames in the original stream, and combine an advantage of each image frame in the plurality of image frames, to obtain a highlight photo with higher picture quality and better character action performance.

In some embodiments, the image processing module may first receive the indication information that is of the target image frames and that is output by the deduplication detection module. In this case, the image processing module may obtain a plurality of image frames based on the indication information, for example, the image processing module may obtain a target image frame i, and one adjacent image frame before the target image frame i and one adjacent image frame after the target image frame i. Then, the image processing module may combine an advantage of each image frame in the plurality of image frames, and fuse the plurality of image frames into one highlight photo.

It can be understood that when the decision-making module does not include the deduplication detection module, the shooting module may receive indication information that is of highlight image frames and that is output by the comprehensive evaluation module, determine original highlight image frames, and obtain highlight photos.

With reference to the user interfaces in FIG. 2A~FIG. 2F, in some embodiments, the image processing module may alternatively generate highlight photos in response to a shooting operation performed by the user. In this case, the original target image frames are image frames obtained when the shooting operation performed by the user is detected. The shooting module may obtain the highlight photos based on the original target image frames.

S60: The terminal device 100 outputs the highlight photos.

As shown in FIG. 5, the output module may include an output buffer. The output buffer may be configured to store the shot highlight photos.

After obtaining the highlight photos, the image processing module may input the highlight photos into the output buffer. Then, the terminal device 100 may read, from the output buffer, the highlight photos stored in the buffer, and display the highlight photos on a screen, for example, on the user interface shown in FIG. 1G.

In some embodiments, the decision-making module may determine a plurality of magic moments according to a preset evaluation rule. Correspondingly, the shooting module may obtain a plurality of highlight photos. Although deduplication processing is performed, there are still a large quantity of highlight photos stored in the output buffer, for example, 10 or 20 highlight photos.

In this case, preferably, the output module may further screen the plurality of highlight photos, to reduce a quantity of highlight photos, and avoid outputting an excessive quantity of highlight photos finally.

Specifically, a screening module may be disposed in the output module. The screening module may screen, according to a preset screening rule, the highlight photos stored in the output buffer. Highlight photos that meet a screening condition may be referred to as target highlight photos. After screening, the target highlight photos in the highlight photos may be retained and the remaining highlight photos may be deleted.

For example, it is assumed that a maximum quantity of output highlight photos is five. When a quantity of highlight photos obtained through deduplication is greater than five, preferably, the screening module may select, from the plurality of highlight photos based on the types shown in S304 (FaceScore=0) and ActionScore=0), FaceScore≠0) and ActionScore=0, and FaceScore≠0 and ActionScore≠0), five highlight photos as highlight photos for final display, namely, target highlight photos. For example, the screening module first selects one highlight photo with highest TotalScore from each of the three types of highlight photos, then selects two highlight photos with highest TotalScore from the remaining highlight photos, and uses the selected highlight photos as highlight photos for final display.

In this way, when an excessive quantity of highlight photos are obtained, the terminal device 100 may further screen the highlight photos to obtain a smaller quantity of target highlight photos.

It can be understood that the downsampling module, the deduplication detection module, and the screening module shown in FIG. 5 are all optional.

In some embodiments, the terminal device may directly perform calculation on the original stream collected by the camera, and determine the magic moments to obtain the highlight photos. In this case, the terminal device can obtain the low-resolution processed stream with a smaller amount of calculation, without downsampling the original stream by using the downsampling module. Correspondingly, the highlight image frames determined by the comprehensive evaluation module are high-resolution image frames in the original stream, so that the shooting module does not need to determine corresponding image frames in the original stream based on timestamps of the processed stream.

In some embodiments, the decision-making module may not include the deduplication detection module. In this case, the shooting module may receive the indication information that is of the highlight image frames and that is output by the comprehensive evaluation module. When the downsampling module is not included, the indication information that is of the highlight image frames and that is output by the comprehensive evaluation module and received by the shooting module is indication information of high-resolution highlight image frames in the original stream.

When the downsampling module is included, the indication information that is of the highlight image frames and that is output by the comprehensive evaluation module and received by the shooting module is indication information of low-resolution highlight image frames in the processed stream. In this case, the shooting module needs to determine the high-resolution highlight image frames in the original stream based on the indication information of the low-resolution highlight image frames, to obtain the highlight photos.

In some embodiments, the shooting procedure shown in FIG. 5 may be performed in real time in the video recording process of the user, with reference to the user interfaces shown in FIG. 1A-FIG. 1G. In some embodiments, the shooting procedure may alternatively be performed on an obtained video, with reference to the user interfaces shown in FIG. 3A, FIG. 3E, and FIG. 3F. In this way, after shooting is completed, the terminal device 100 may also determine and display highlight photos in one video based on a requirement.

In this embodiment of this application,
the interface shown in FIG. 1B may be referred to as a preview interface, the control 122 shown in FIG. 1B may be referred to as a first control, a tap operation performed by the user on the control 122 may be referred to as a first operation, and a moment at which the user taps the control 122 may be referred to as a first moment.

The interface shown in FIG. 1C may be referred to as a recording interface, the control 122 shown in FIG. 1C may be referred to as a second control, a tap operation performed by the user on the control 122 may be referred to as a second operation, and a moment at which the user taps the control 122 may be referred to as a second moment.

A video obtained after shooting operations shown in FIG. 1C-FIG. 1E are completed, namely, the video shown in FIG. 1F, may be referred to as a first video. As shown in FIG. 1G, the photo 142A (142B. 142C, 142D, or 142E) obtained in the process of recording the first video may be referred to as a first image frame. An image frame that corresponds to the first image frame and that is in the first video may be referred to as a second image frame. An image frame in the original stream from which the first image frame is obtained may be referred to as a first image. A moment at which the camera collects the first image may be referred to as a third moment. A character in the photo 142D may be referred to as a first target object.

As shown in FIG. 2A, the control 211 in the recording interface may be referred to as a third control, a tap operation performed by the user on the control 211 may be referred to as a third operation, and a moment at which the user taps the control 211 may be referred to as a fourth moment. The photo 212A obtained based on an image collected by the camera at the fourth moment may be referred to as a third image frame.

Figure 1J:
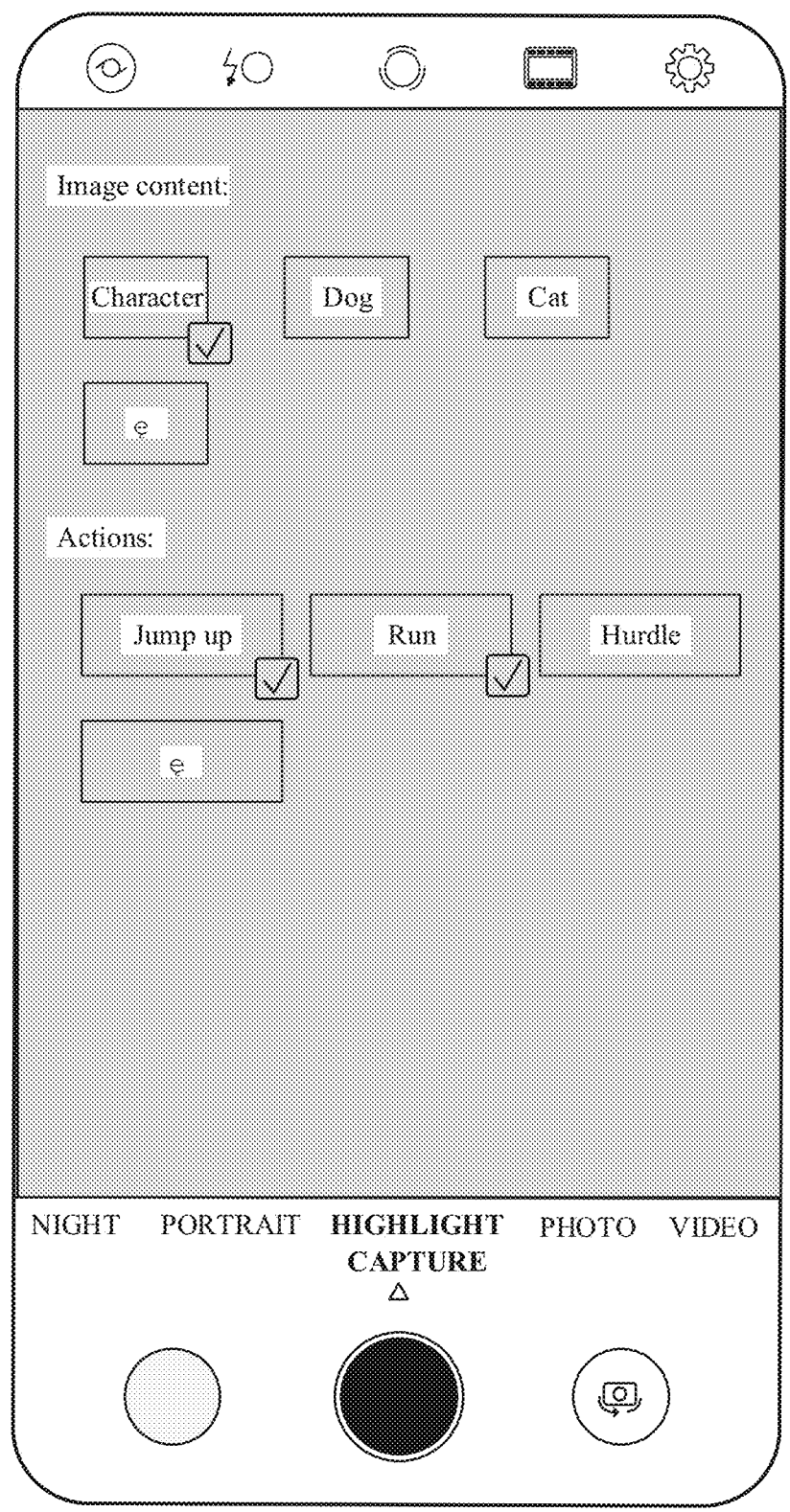

The interface shown in FIG. 1J may be referred to as a settings interface. In FIG. 1J, choices such as "character", "dog", and "cat" may be referred to as first options; "character", "dog", and "cat" may be referred to as first target objects; choices such as "jump up", "run", and "hurdle" may be referred to as second options; and "jump up", "run", and "hurdle" may be referred to as actions performed by the first target objects.

The interfaces shown in FIG. 3A and FIG. 3D may be referred to as display interfaces.

As shown in FIG. 8, when the first image corresponds to the image frame 411, the image frames 412 and 413 may be referred to as third images; when the first image corresponds to the image frame 421, the image frames 422 and 423 may be referred to as third images; or the like. A moment at which the camera collects the image frame 412, 413, 422, or 423 may be referred to as a fifth moment.

Figure 9:
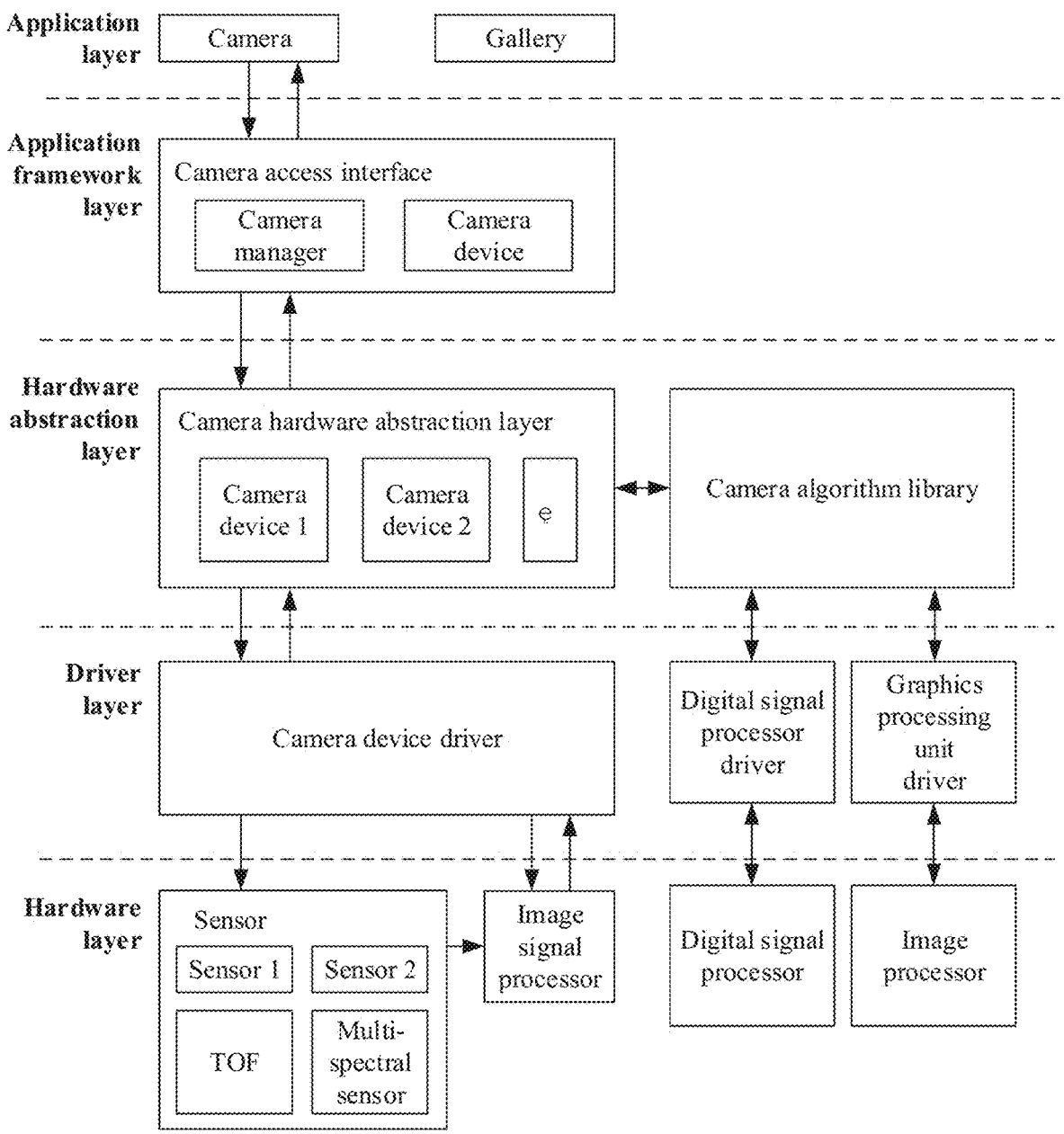
FIG. 9 is a schematic diagram of a system structure of a terminal device according to an embodiment of this application.

FIG. 9 is a schematic diagram of a system structure of a terminal device 100 according to an embodiment of this application.

The following describes the system structure of the terminal device 100 as an example.

A layered architecture divides the system into several layers, and each layer has a clear role and task. The layers communicate with each other through a software interface. In some embodiments, the system is divided into five layers, an application layer, an application framework layer, a hardware abstraction layer, a driver layer, and a hardware layer from top to bottom.

The application layer may include a series of application packages. In this embodiment of this application, the application packages may include a camera, a gallery, and the like.

The application framework layer provides an application programming interface (application programming interface, API) and a programming framework for an application at the application layer. The application framework layer includes some predefined functions. In this embodiment of this application, the application framework layer may include a camera access interface, and the camera access interface may include a camera manager and a camera device. The camera access interface is configured to provide an application programming interface and a programming framework for a camera application.

The hardware abstraction layer is an interface layer located between the application framework layer and the driver layer, and provides a virtual hardware platform for an operating system. In this embodiment of this application, the hardware abstraction layer may include a camera hardware abstraction layer and a camera algorithm library.

The camera hardware abstraction layer may provide virtual hardware for a camera device 1 (a first camera), a camera device 2 (a second camera), or more camera devices. The camera algorithm library may include run code and data for implementing the shooting method provided in the embodiments of this application.

The driver layer is a layer between hardware and software. The driver layer includes various hardware drivers. The driver layer may include a camera device driver, a digital signal processor driver, and a graphics processing unit driver.

The camera device driver is configured to drive a sensor of a camera to collect an image, and drive an image signal processor to preprocess the image. The digital signal processor driver is configured to drive a digital signal processor to process the image. The graphics processing unit driver is configured to drive a graphics processing unit to process the image.

The following specifically describes the method in the embodiments of this application with reference to the foregoing hardware structure and system structure:

1. The terminal device 100 enables a shooting function to obtain an original stream.

Step 1 is continuously performed. In response to an operation (for example, a tap operation) performed by a user on a camera application icon, a camera application invokes the camera access interface at the application framework layer, to enable the camera application, and further invoke the camera device 1 (the first camera) at the camera hardware abstraction layer to send an instruction instructing to enable the camera application. The camera hardware abstraction layer sends the instruction to the camera device driver at the driver layer, and the camera device driver may enable a sensor (a sensor 1) of the first camera in cameras, to collect an image optical signal by using the sensor 1. The image optical signal is transmitted to the image signal processor for preprocessing, to obtain the original stream (an image sequence constituted by at least two original image frames), and then the original stream is transmitted to the camera hardware abstraction layer by using the camera device driver.

2. The terminal device 100 obtains a processed stream based on the original stream.

Step 2 is continuously performed. The camera hardware abstraction layer may send the original stream to the camera algorithm library. Based on support of the digital signal processor and the graphics processing unit, the camera algorithm library may first downsample the original stream to obtain a low-resolution processed stream.

3. The terminal device 100 evaluates image frames in the processed stream to determine highlight photos.

Step 3 is continuously performed. Based on support of the digital signal processor and the graphics processing unit, the camera algorithm library may invoke a picture quality detection algorithm, a face detection algorithm, a smile detection algorithm, an eye-closing detection algorithm, and the like to detect picture quality, image content, an action, and the like of each image frame, to determine ImageQualityScore, FaceScore, ActionScore, and TotalScore of each image frame, and further determine highlight image frames. Further, the camera algorithm library may further invoke an image similarity detection algorithm to perform deduplication detection on the highlight image frames. Then, the camera algorithm library may determine, from the original stream, original highlight image frames that match the highlight image frames, and finally obtain highlight photos based on the original highlight image frames.

4. The terminal device 100 displays the highlight photos.

The camera algorithm library may send the highlight photos to the camera hardware abstraction layer. Then, the camera hardware abstraction layer may send the highlight photos for display.

Figure 10:
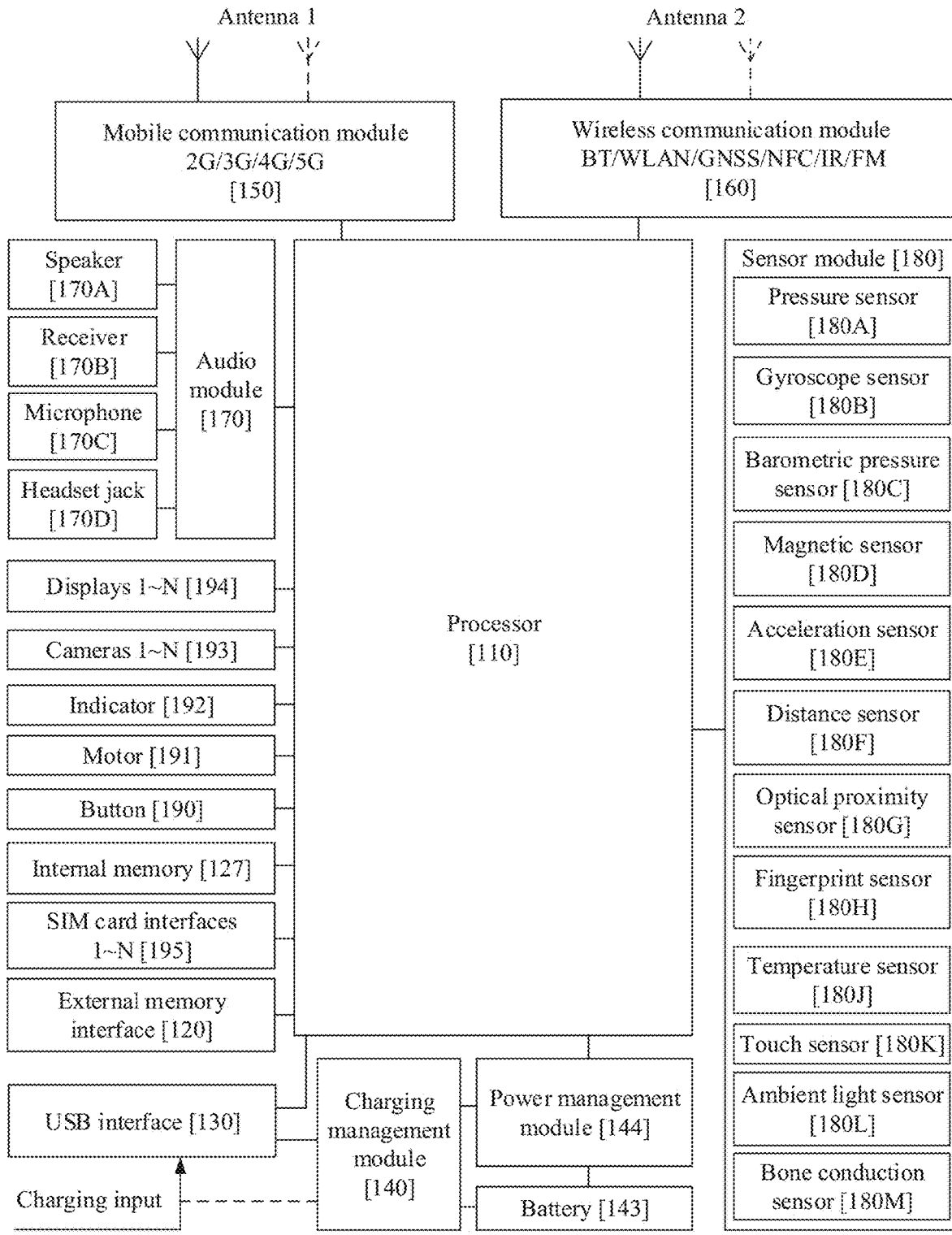
FIG. 10 is a schematic diagram of a hardware structure of a terminal device according to an embodiment of this application.

FIG. 10 is a schematic diagram of a hardware structure of a terminal device 100.

As shown in FIG. 10, the terminal device 100 may include a processor 110, an external memory interface 120, an internal memory 127, a universal serial bus (universal serial bus, USB) interface 130, a charging management module 140, a power management module 144, a battery 143, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module. SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the terminal device 100. In some other embodiments of this application, the terminal device 100 may include more or fewer components than those shown in the figure, combine some components, split some components, or have different component arrangements. The components shown in the figure may be implemented by hardware, software, or a combination of software and hardware.

The processor 110 may include one or more processing units. For example, the processor 110 may include an application processor (application processor. AP), a modem processor, a graphics processing unit (graphics processing unit. GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a timing signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation. PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module. SIM) interface, a universal serial bus (universal serial bus, USB) interface, and/or the like.

It can be understood that an interface connection relationship among the modules shown in this embodiment of the present invention is merely an example for description, and does not constitute a limitation on the structure of the terminal device 100. In some other embodiments of this application, the terminal device 100 may alternatively use an interface connection manner different from that in the foregoing embodiment, or use a combination of a plurality of interface connection manners.

The charging management module 140 is configured to receive a charging input from a charger.

The power management module 144 is configured to connect the battery 143 and the charging management module 140 to the processor 110. The power management module 144 receives an input of the battery 143 and/or an input of the charging management module 140, to supply power to the processor 110, the internal memory 127, the display 194, the camera 193, the wireless communication module 160, and the like.

A wireless communication function of the terminal device 100 may be implemented by using the antenna 1, the antenna 2, the mobile communication module 150, the wireless communication module 160, the modem processor, the baseband processor, and the like.

The terminal device 100 implements a display function by using the GPU, the display 194, the application processor, and the like. The GPU is a microprocessor for image processing, and is connected to the display 194 and the application processor. The GPU is configured to perform mathematical and geometric calculation, and is configured to render graphics. The processor 110 may include one or more GPUs. The one or more GPUs execute program instructions to generate or change display information.

The display 194 is configured to display an image, a video, and the like. The display 194 includes a display panel. The display 194 includes a display panel. The display panel may be a liquid crystal display (liquid crystal display, LCD). Alternatively, the display panel may be manufactured by using an organic light-emitting diode (organic light-emitting diode. OLED), an active-matrix organic light emitting diode or an active-matrix organic light emitting diode (active-matrix organic light emitting diode, AMOLED), a flexible light-emitting diode (flex light-emitting diode. FLED), a miniled, a microled, a micro-oled, a quantum dot light emitting diode (quantum dot light emitting diodes. QLED), or the like. In some embodiments, the terminal device may include one or N displays 194, where N is a positive integer greater than 1.

In this embodiment of this application, the terminal device 100 may display, by using a display capability provided by the display 194, the user interfaces shown in FIG. 1A-FIG. 1J, FIG. 2A-FIG. 2F, and FIG. 3A-FIG. 3F, including image resources such as photos and videos that are displayed on the interfaces.

The terminal device 100 may implement a shooting function by using the ISP, the camera 193, the video codec, the GPU, the display 194, the application processor, and the like.

The ISP is configured to process data fed back by the camera 193. For example, a shutter is opened during shooting, light is transmitted to a photosensitive element of the camera through a lens module, an optical signal is converted into an electrical signal, and the photosensitive element of the camera transmits the electrical signal to the ISP for processing, so that the electrical signal is converted into an image visible to a naked eye. The ISP may further perform algorithm optimization on noise, brightness, and a skin tone of the image. The ISP may further optimize parameters such as exposure and a color temperature of a shooting scenario. In some embodiments, the ISP may be disposed in the camera 193.

The camera 193 is configured to capture a still image or a video. An optical image is generated for an object through the lens module and is projected onto the photosensitive element. The photosensitive element may be a charge coupled device (charge coupled device. CCD) or a complementary metal-oxide-semiconductor (complementary metal-oxide-semiconductor, CMOS) phototransistor. The photosensitive element converts an optical signal into an electrical signal and then transmits the electrical signal to the ISP, and the ISP converts the electrical signal into a digital image signal. The ISP outputs the digital image signal to the DSP for processing. The DSP converts the digital image signal into an image signal in a standard format, for example, RGB or YUV. In some embodiments, the terminal device 100 may include one or N cameras 193, and N is a positive integer greater than 1.

The digital signal processor is configured to process a digital signal. In addition to processing a digital image signal, the digital signal processor can further process another digital signal. For example, when the terminal device 100 performs frequency selection, the digital signal processor is configured to perform Fourier transform and the like on frequency energy.

The video codec is configured to compress or decompress a digital video. The terminal device 100 can support one or more video codecs. In this way, the terminal device 100 may play or record videos in a plurality of encoding formats, for example, moving picture experts group (moving picture experts group, MPEG)1, MPEG2, MPEG3, and MPEG4.

The NPU is a neural-network (neural-network, NN) computing processor that quickly processes input information by referring to a biological neural network structure, for example, by referring to a transmission mode between human brain neurons, and may further perform self-learning continuously. Applications such as intelligent cognition of the terminal device 100 may be implemented by using the NPU, for example, image recognition, face recognition, speech recognition, and text understanding.

In this embodiment of this application, the terminal device 100 may collect images by using capabilities provided by the camera 193, the ISP, and the digital signal processor, to obtain an original stream. During video shooting, the terminal device 100 may generate a video in a particular format by using the video codec. The terminal device 100 may detect image quality and identify image content and an action by using an intelligent cognitive capability provided by the NPU.

The internal memory 127 may include one or more RAMs (random access memory, RAM) and one or more NVMs (non-volatile memory, NVM). The RAM may be directly read and written by the processor 110, may be configured to store an executable program (for example, machine instructions) of an operating system or another running program, and may be further configured to store data of a user, data of an application, and the like. The NVM may also store the executable program, the data of the user, the data of the application, and the like, which may be loaded into the RAM in advance to be directly read and written by the processor 110.

The external memory interface 120 may be configured to connect to an external NVM, to expand a storage capability of the terminal device 100. The external NVM communicates with the processor 110 through the external memory interface 120, to implement a data storage function, for example, store files such as a photo and a video in the external NVM.

The terminal device 100 may implement an audio function, for example, music playing or recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. In this embodiment of this application, the terminal device 100 may play an audio signal in a video by using the speaker 170A when playing the video. The receiver 170B, also referred to as an "earpiece", is configured to convert an audio electrical signal into a sound signal. The microphone 170C, also referred to as a "mic" or "mike", is configured to convert a sound signal into an electrical signal. In this embodiment of this application, the terminal device 100 may collect a sound signal by using the microphone 170C in a video recording process. The terminal device 100 may be provided with at least one microphone 170C. In some other embodiments, the terminal device 100 may be provided with two microphones 170C, which can implement a noise reduction function in addition to sound signal collection. In some other embodiments, the terminal device 100 may alternatively be provided with three, four, or more microphones 170C, to implement sound signal collection, noise reduction, sound source recognition, a directional recording function, and the like. The headset jack 170D is configured to connect to a wired headset.

The pressure sensor 180A is configured to sense a pressure signal, and can convert the pressure signal into an electrical signal. In some embodiments, the pressure sensor 180A may be disposed in the display 194. The gyroscope sensor 180B may be configured to determine a motion pose of the terminal device 100. The barometric pressure sensor 180C is configured to measure a barometric pressure. The magnetic sensor 180D may include a Hall sensor. The terminal device 100 can use the magnetic sensor 180D to detect opening and closing of a flip holster.

The acceleration sensor 180E may detect acceleration of the terminal device 100 in various directions (usually on three axes), may detect a magnitude and a direction of gravity when the electronic device 100 is still, may be further configured to identify a pose of the terminal device, and is applied to applications such as switching between a landscape screen and a portrait screen. The distance sensor 180F is configured to measure a distance. The terminal device 100 may measure a distance by using infrared or laser light. In some embodiments, in a shooting scenario, the terminal device 100 may use the distance sensor 180F to measure a distance to implement quick focusing.

The terminal device 100 can use the optical proximity sensor 180G to detect that a user holds the terminal device 100 close to an ear for a call, to automatically turn off the screen to save power. The optical proximity sensor 180G may also be used in a holster mode or a pocket mode to automatically unlock or lock the screen. The ambient light sensor 180L is configured to sense luminance of ambient light. The terminal device 100 may adaptively adjust luminance of the display 194 based on the sensed luminance of the ambient light.

The fingerprint sensor 180H is configured to collect a fingerprint. The terminal device 100 may use a characteristic of the collected fingerprint to implement fingerprint-based unlock, application lock access, fingerprint-based shooting, fingerprint-based incoming call answering, and the like. The temperature sensor 180J is configured to detect a temperature.

The touch sensor 180K is also referred to as a "touch device". The touch sensor 180K may be disposed in the display 194. The touch sensor 180K and the display 194 constitute a touchscreen, which is also referred to as a "touch screen panel" The touch sensor 180K is configured to detect a touch operation performed on or near the touch sensor 180K. The touch sensor may transmit the detected touch operation to the application processor, to determine a type of a touch event, and provide a visual output related to the touch operation by using the display 194. In some other embodiments, the touch sensor 180K may alternatively be disposed on a surface of the terminal device 100, and is disposed at a location different from a location of the display 194.

In this embodiment of this application, the terminal device 100 may detect, by using a touch detection capability provided by the touch sensor 180K, user operations such as tapping and swiping performed by the user on the screen, to control enable and disable of an application and a device, and implement switching between different user interfaces.

The bone conduction sensor 180M may obtain a vibration signal. The application processor may parse heart rate information based on a blood pressure pulse signal obtained by the bone conduction sensor 180M, to implement a heart rate detection function.

Buttons 190 include a power on/off button, a volume button, and the like. The button 190 may be a mechanical button, or may be a touch button. The terminal device 100 may receive a button input, and generate a button signal input related to user settings and function control of the terminal device 100. In some embodiments, the terminal device 100 may control photo or video shooting by using the button 190.

The motor 191 may generate a vibration alert. The motor 191 may be configured to provide a vibration alert for an incoming call, and may be further configured to provide vibration feedback for a touch. The indicator 192 may be an indicator light, may be configured to indicate a charging status or a change in charge, and may be further configured to indicate a message, a missed incoming call, a notification, and the like. The SIM card interface 195 is configured to connect to a SIM card.

A term "user interface (user interface. UI)" in the specification, claims, and accompanying drawings of this application is a medium interface for interaction and information exchange between a user and an application or an operating system, and implements conversion between an internal form of information and a form acceptable to the user. A user interface of an application is source code written in a specific computer language such as java or an extensible markup language (extensible markup language, XML). The source code of the interface is parsed and rendered on the terminal device, and finally is presented as user-identifiable content, for example, a control such as a picture, a text, or a button. The control (control) is also referred to as a widget (widget), and is a basic element of the user interface. Typical controls include a toolbar (toolbar), a menu bar (menu bar), a text box (text box), a button (button), a scrollbar (scrollbar), a picture, and a text. An attribute and content of the control in the interface are defined by using a tag or a node. For example, the control included in the interface is defined in the XML by using a node such as <Textview>, <ImgView>, or <Video View>. One node corresponds to one control or attribute in the interface. After being parsed and rendered, the node is presented as user-visible content. In addition, interfaces of many applications, for example, an interface of a hybrid application (hybrid application), usually further include web pages. The web page, also referred to as a page, may be understood as a special control embedded in an application interface. The web page is source code written in a specific computer language, for example, a hypertext markup language (hypertext markup language, GTML), cascading style sheets (cascading style sheets, CSS), or a javascript (JavaScript, JS). The source code of the web page may be loaded and displayed as user-identifiable content by a browser or a web page display component with a function similar to that of the browser. Specific content included in the web page is also defined by using a tag or a node in the source code of the web page. For example, an element and an attribute of the web page are defined in the GTML by using <p>, <img>, <video>, and <canvas>.

The user interface is usually in a representation form of a graphic user interface (graphic user interface, GUI), and the graphic user interface is a user interface that is related to a computer operation and that is displayed in a graphical manner. The graphic user interface may be an interface element such as an icon, a window, or a control that is displayed in a display of an electronic device. The control may include visible interface elements such as an icon, a button, a menu, a tab, a text box, a dialog box, a status bar, a navigation bar, and a widget.

The singular expression forms "one", "one type of", "the", "the foregoing", and "this" used in the specification and the appended claims of this application are also intended to include plural expression forms, unless otherwise specified in the context clearly. It should be further understood that the term "and/or" used in this application indicates and includes any or all possible combinations of one or more listed items. As used in the foregoing embodiments, based on the context, the term "when" may be interpreted as a meaning of "if", "after", "in response to determining", or "in response to detecting". Similarly, based on the context, the phrase "when determining" or "if detecting (a stated condition or event)" may be interpreted as a meaning of "if determining . . . ", "in response to determining . . . ", "when detecting (a stated condition or event)", or "in response to detecting . . . (a stated condition or event)".

All or some of the foregoing embodiments may be implemented by software, hardware, firmware, or any combination thereof. When being implemented by the software, the embodiments may be completely or partially implemented in a form of a computer program product. The computer program product includes one or more computer instructions. When the computer program instructions are loaded and executed on a computer, all or some of procedures or functions according to the embodiments of this application are produced. The computer may be a general-purpose computer, a special-purpose computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, through a coaxial cable, an optical fiber, or a digital subscriber line) or a wireless manner (for example, by using infrared, wireless, or microwave). The computer-readable storage medium may be any available medium accessible by the computer, or a data storage device including a server or a data center that integrates one or more available media. The available medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in the foregoing embodiments are implemented. The procedures may be completed by a computer program instructing related hardware. The program may be stored in the computer-readable storage medium. When the program is executed, the procedures in the foregoing method embodiments may be included. The foregoing storage medium includes any medium that can store program code, for example, a ROM, a random storage memory RAM, a magnetic disk, or a compact disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
    displaying a preview interface that comprises a first control;
    detecting, at a first moment, a first operation performed on the first control, and starting recording of a first video by a camera;
    displaying a recording interface of the first video, wherein the recording interface comprises a second control;
    detecting, at a second moment, a second operation performed on the second control, and ending the recording of the first video; and
    saving the first video and a first image frame, wherein the first video comprises a second image frame obtained by processing a first image collected by the camera at a third moment,
    wherein the third moment is between the first moment and the second moment,
    wherein the first image frame is obtained by processing the first image to obtain the first image frame when a first target object in the first image meets a first preset condition, wherein the first target object in the first image meets the first preset condition when the first image comprises the first target object and the first target object performs a preset action, and wherein the first image comprises the first target object and the first target object performs the preset action when a comprehensive score of the first image is greater than a first threshold, and wherein the comprehensive score comprises an image quality score ImageQualityScore, a portrait score FaceScore, and an action score ActionScore, ImageQualityScore is based on a definition in picture quality of an image, FaceScore is based on a status of the first target object in the first image, and ActionScore is based on a degree of completion of the preset action of the first target object in the first image.

2. The method of claim 1, wherein a resolution of the first image frame is the same as or greater than a resolution of the second image frame.

3. The method of claim 1, wherein the first control is the same as or different from the second control.

4. The method of claim 1, wherein the recording interface further comprises a third control, and the method further comprises detecting, at a fourth moment, a third operation performed on the third control, to obtain a third image frame, wherein the fourth moment is between the first moment and the second moment, and the third image frame is obtained by processing a second image collected by the camera at the fourth moment, and wherein saving the first video and the first image frame comprises saving the first video, the first image frame, and the third image frame.

5. The method of claim 4, wherein the first image frame and the third image frame are image frames that have clear picture quality and meaningful image content and that are collected by the camera between the first moment and the second moment, wherein clear picture quality refers to the image frame having a definition greater than a threshold, and wherein meaningful image content of the image frame refers to the image frame comprising the first target object and/or one or more actions corresponding to the first target object.

6. The method of claim 4, comprising:
displaying a display interface that comprises a thumbnail of the first video; and
detecting a fourth operation performed on the thumbnail, and displaying the first video, the first image frame, and the third image frame in response to the fourth operation.

7. The method of claim 1, wherein before the first moment, the method further comprises displaying a settings interface that comprises a first option and a plurality of second options, wherein the first option indicates the first target object, and the plurality of second options correspond to the first target object and indicate a plurality of actions performed by the first target object.

8. The method of claim 1, further comprising displaying a display interface that comprises a thumbnail of the first video, a thumbnail of the first image frame, and a thumbnail of the third image frame.

9. The method of claim 1, wherein the first target object comprises a character, and the preset action is any one of jumping up, running, hurdling, shooting, and making a V gesture.

10. The method of claim 1, wherein a higher ImageQualityScore for the first image corresponds to a higher definition of the first image, wherein FaceScore=0 for the first image indicates that the first image does not comprise the first target object, and FaceScore>0 for the first image indicates that the first image comprises the first target object and that the first target object is smiling and/or has open eyes, and wherein ActionScore=0 for the first image indicates that the first target object does not perform an action, ActionScore>0 for the first image indicates that the first target object performs an action, and a higher ActionScore for the first image indicates a higher degree of completion of the action.

11. The method of claim 1, wherein if FaceScore=0 and ActionScore=0, the first threshold is a first value M1, wherein if FaceScore=0 and ActionScore≠0, the first threshold is a second value M2, and wherein if FaceScore≠0 and ActionScore≠0, the first threshold is a third value M0.

12. The method of claim 11, wherein M1<M2<M0.

13. The method of claim 1, wherein when the comprehensive score of the first image is greater than the first threshold, the method further comprises:
either a) determining that the first image is not similar to a third image, wherein the third image is an image collected by the camera at a fifth moment, the fifth moment is between the first moment and the second moment, and the fifth moment is different from the third moment; or
b) determining that the first image is similar to the third image, but the comprehensive score of the first image is greater than that of the third image.

14. The method of claim 1, wherein processing the first image to obtain the first image frame comprises fusing the first image and N image frames adjacent to the first image to obtain the first image frame.

15. The method of claim 1, wherein the first target object in the first image meets the first preset condition when the first image comprises the first target object and an expression of the first target object meets a preset expression, wherein the first target object comprises a character, and the preset expression comprises any one of smiling, laughing, smiling with eyes closed, blinking, and pouting.

16. The method of claim 15, wherein the first image comprises the first target object and the expression of the first target object meets the preset expression when the comprehensive score of the first image is greater than the first threshold, wherein a higher ImageQualityScore for the first image corresponds to a higher definition of the first image, wherein FaceScore=0 for the first image indicates that the first image does not comprise the first target object, and FaceScore>0 for the first image indicates that the first image comprises the first target object and that the first target object is smiling and/or has open eyes, and wherein ActionScore=0 for the first image indicates that the first target object does not perform an action, ActionScore>0 for the first image indicates that the first target object performs an action, and a higher ActionScore for the first image indicates a higher degree of completion of the action.

17. The method of claim 1, wherein the first target object in the first image meets the first preset condition when a definition in picture quality of the first image is greater than a preset value.

18. An electronic device, comprising:
one or more processors;
a camera coupled to the one or more processors; and
one or more memories coupled to the one or more processors, the one or more memories configured to store instructions that, when executed by the one or more processors cause the electronic device to be configured to:
display a preview interface that comprises a first control;

detect, at a first moment, a first operation performed on the first control, and start recording of a first video by the camera;

display a recording interface of the first video, wherein the recording interface comprises a second control;

detect, at a second moment, a second operation performed on the second control, and end the recording of the first video; and save the first video and a first image frame, wherein the first video comprises a second image frame obtained by processing a first image collected by the camera at a third moment, wherein the third moment is between the first moment and the second moment, and wherein the first image frame is obtained by processing the first image to obtain the first image frame when a first target object in the first image meets a first preset condition, wherein the first target object in the first image meets the first preset condition when the first image comprises the first target object and the first target object performs a preset action, and wherein the first image comprises the first target object and the first target object performs the preset action when a comprehensive score of the first image is greater than a first threshold, and wherein the comprehensive score comprises an image quality score ImageQualityScore, a portrait score FaceScore, and an action score ActionScore, ImageQualityScore is based on a definition in picture quality of an image, FaceScore is based on a status of the first target object in the first image, and ActionScore is based on a degree of completion of the preset action of the first target object in the first image.

19. The electronic device of claim 18, wherein the first target object in the first image meets the first preset condition when the first image comprises the first target object and an expression of the first target object meets a preset expression, and wherein the first image comprises the first target object and the expression of the first target object meets the preset expression when the comprehensive score of the first image is greater than the first threshold, wherein a higher ImageQualityScore for the first image corresponds to a higher definition of the first image, wherein FaceScore=0 for the first image indicates that the first image does not comprise the first target object, and FaceScore>0 for the first image indicates that the first image comprises the first target object and that the first target object is smiling and/or has open eyes, and wherein ActionScore=0 for the first image indicates that the first target object does not perform an action, ActionScore>0 for the first image indicates that the first target object performs an action, and a higher ActionScore for the first image indicates a higher degree of completion of the action.

20. A non-transitory computer-readable storage medium, comprising instructions that, when executed by one or more processors of an electronic device, cause the electronic device to be configured to:

display a preview interface that comprises a first control;

detect, at a first moment, a first operation performed on the first control, and start recording of a first video by a camera;

display a recording interface of the first video, wherein the recording interface comprises a second control;

detect, at a second moment, a second operation performed on the second control, and end the recording of the first video; and save the first video and a first image frame, wherein the first video comprises a second image frame obtained by processing a first image collected by the camera at a third moment, wherein the third moment is between the first moment and the second moment, and wherein the first image frame is obtained by processing the first image to obtain the first image frame when a first target object in the first image meets a first preset condition, wherein the first target object in the first image meets the first preset condition when the first image comprises the first target object and the first target object performs a preset action, and wherein the first image comprises the first target object and the first target object performs the preset action when a comprehensive score of the first image is greater than a first threshold, and wherein the comprehensive score comprises an image quality score ImageQualityScore, a portrait score FaceScore, and an action score ActionScore, ImageQualityScore is based on a definition in picture quality of an image, FaceScore is based on a status of the first target object in the first image, and ActionScore is based on a degree of completion of the preset action of the first target object in the first image.

* * * * *